(12) United States Patent
Dabbaj

(10) Patent No.: US 7,196,599 B2
(45) Date of Patent: Mar. 27, 2007

(54) ELECTROSTATIC DEVICE

(76) Inventor: Rad H. Dabbaj, 5 Linchfield Road, Datchet, Berkshire (GB) SL3 9NA ( * ) Notice: Subject to any disclaimer, the term of this patent is extended or adjusted under 35 U.S.C. 154(b) by 190 days.

(21) Appl. No.: 10/433,743

(22) PCT Filed: Dec. 4, 2001

(86) PCT No.: PCT/GB01/05349

§ 371 (c)(1),
(2), (4) Date: Sep. 23, 2003

(87) PCT Pub. No.: WO02/49199

PCT Pub. Date: Jun. 20, 2002

(65) Prior Publication Data

US 2004/0056742 A1    Mar. 25, 2004

(30) Foreign Application Priority Data

| Dec. 11, 2000 | (GB) | ................................. 0030103.6 |
| Jan. 30, 2001 | (GB) | ................................. 0102337.3 |
| Aug. 14, 2001 | (GB) | ................................. 0119759.9 |
| Nov. 1, 2001 | (GB) | ................................. 0126233.3 |

(51) Int. Cl.
*H01H 51/22* (2006.01)
(52) U.S. Cl. ........................................ 335/78; 200/181
(58) Field of Classification Search .................. 335/78; 200/181; 333/101
See application file for complete search history.

(56) References Cited

U.S. PATENT DOCUMENTS

| 4,356,730 A | * | 11/1982 | Cade ........................ 73/514.26 |
| 4,665,610 A | | 5/1987 | Barth .......................... 29/580 |
| 5,206,557 A | | 4/1993 | Bobbio ....................... 310/309 |
| 5,290,400 A | | 3/1994 | Bobbio ....................... 156/655 |
| 5,434,464 A | | 7/1995 | Bobbio et al. .............. 310/309 |
| 5,479,061 A | | 12/1995 | Bobbio et al. .............. 310/309 |
| 5,563,466 A | | 10/1996 | Rennex et al. .............. 310/309 |
| 5,870,007 A | * | 2/1999 | Carr et al. ................... 333/262 |
| 6,000,280 A | | 12/1999 | Miller et al. ................... 73/105 |
| 6,236,491 B1 | | 5/2001 | Goodwin-Johansson .... 359/291 |

(Continued)

OTHER PUBLICATIONS

"Single Mask, Large Force, and Large Displacement Electrostatic Linear Inchworm Motors" by Yeh et al., Journal of Microelectromechanical Systems, vol. 11, No. 4, Aug. 2002, pp. 330-336.

(Continued)

*Primary Examiner*—Elvin Enad
*Assistant Examiner*—Bernard Rojas
(74) *Attorney, Agent, or Firm*—Sheridan Ross P.C.

(57) ABSTRACT

An electrostatic device (10) includes a first flexible electrode (1) on which a plurality of second electrodes (2) are mounted so as to move with the first electrode (1). Upon the application of an electrical charge, the or each second electrode (2) causes deflection of the first electrode (1) which deflection is enhanced by the movement of the second electrode therewith. A variety of different designs of the device are possible to provide movement of the first electrode in a plurality of directions and also different types of in and out of plane movement, including rotation and twisting. The structure enables the device to operate at voltage levels compatible with integrated circuits and for the device to be manufactured using integrated circuit manufacturing techniques.

63 Claims, 10 Drawing Sheets

U.S. PATENT DOCUMENTS

| | | | |
|---|---|---|---|
| 6,275,325 B1 * | 8/2001 | Sinclair | 359/291 |
| 6,327,855 B1 | 12/2001 | Hill et al. | 60/528 |
| 6,456,420 B1 | 9/2002 | Goodwin-Johansson | 359/291 |
| 6,483,056 B2 * | 11/2002 | Hyman et al. | 200/181 |
| 2001/0048265 A1 | 12/2001 | MIller et al. | 310/309 |
| 2002/0171327 A1 | 11/2002 | Miller et al. | 310/309 |

OTHER PUBLICATIONS

"Micromachined Pressure Sensors", The MEMS Handbook, edited by M. Gad-el-Hak, CRC Press, pp. 25-7-25-11 (2002).

"Design and Fabrication of Submicrometer, Single Crystal Si Accelerometer" by Welgood et al., Journal Microelectromechanical Systems, vol. 10, No. 4, Dec. 2001, pp. 518-524.

"Integrated Force Arrays" by Bobbio et al., IEEE 1993, pp. 149-154.

"Membrane Based Actuator—Integrated Force Arrays" by Bousaba et al., IEEE, 1994, pp. 845-846.

"Integrated Force Arrays: Theory and Modeling of Static Operation" by Jacobson, et al., Journal of Microelectromechanical Systems, vol. 4, No. 3, Sep. 1995, pp. 139-150.

"Fabrication of Distributed Electrostatic Micro Actuator (DEMA)", by Minami et al., Journal of Microelectromechanical Systems, vol. 2, No. 3, Sep. 1993, pp. 121-127.

"Distributed Electrostatic Micro Actuator" by Yamaguchi et al., IEEE 1993, pp. 18-23.

"DC-GHz Micromachined Capacitive Air Transducers" by Khuri-Yakub et al., E.L Ginzton Laboratory, Stanford University.

"Microrobotics", by Ebefors et al., The MEMS Handbook, edited by M. Gad-el-Hak, CRC Press, p. 28-21 (2002).

"Chapter 6. Mechanical Actuators", Micromachined Transducers Handbook, pp. 276-305.

"Micromanipulation for Micro- and Nano-Manufacturing" by Johansson, IEEE, 1995, pp. 3-8.

"Nickel-Filled Hexsil Thermally Actuated Tweezers" by Keller et al., The 8th Int'l Conf. On Solid-State Sensors and Actuators, and Eurosensors IX, Stockholm, Sweden, Jun. 25-29, 1995, pp. 376-379.

"A Walking Silicon Micro-Robot" by Ebefors et al., Transducers '99, Jun. 7-10, 1999, Sendai, Japan, pp. 1202-1205.

"Review: Microactuators for Microrobots: A Critical Survey" by Dario et al., J. Micromech, Microeng. 2, (1992) pp. 141-157.

"Micro Mechanisms" by Hayashi, Journal of Robotics and Mecatronics, vol. 3, No. 1, 1991, pp. 2-7.

"Silicon-Processed Overhanging Microgripper" by Kim et al., Journal of Microelectromechanical Systems., vol. 1, No., 1 Mar. 1992, pp. 31-36.

"Hexsil Tweezers for Teleoperated Micro-Assembly" by Keller et al., IEEE, 1997, pp. 72-77.

"Chapter 5, Section 5.3.2. Microactuators" by Gorecki, MEMS and MOEMS Techology and Applications, vol. PM85, 2000, pp. 255-257.

"Arrays of Thermal Micro-Actuators Coupled to Micro-Optical Components" by Reid et al., Actuator Technology and Applications., vol. 2865, pp. 74-82 (1996).

* cited by examiner

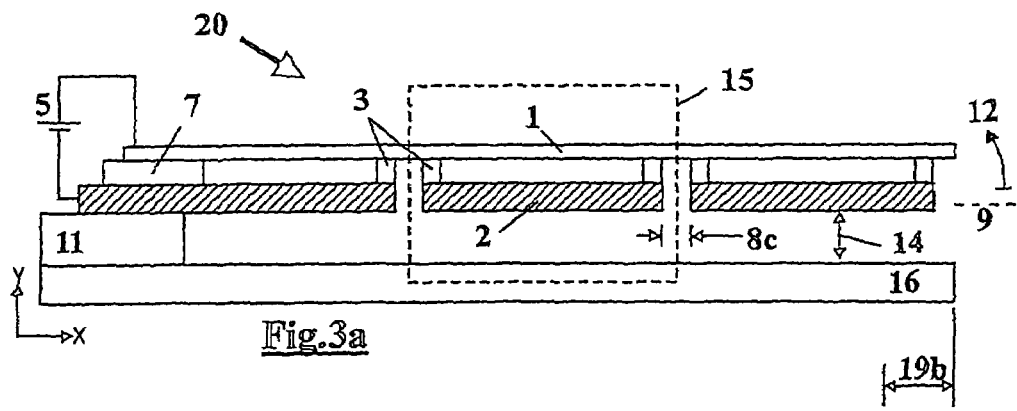
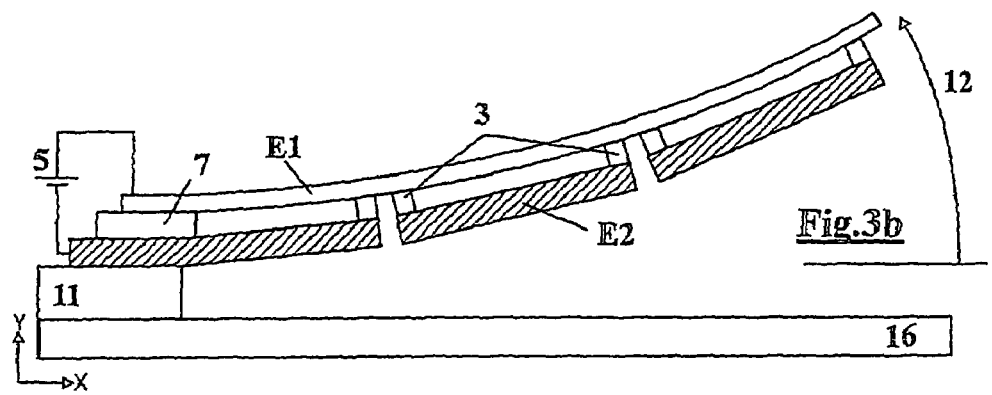
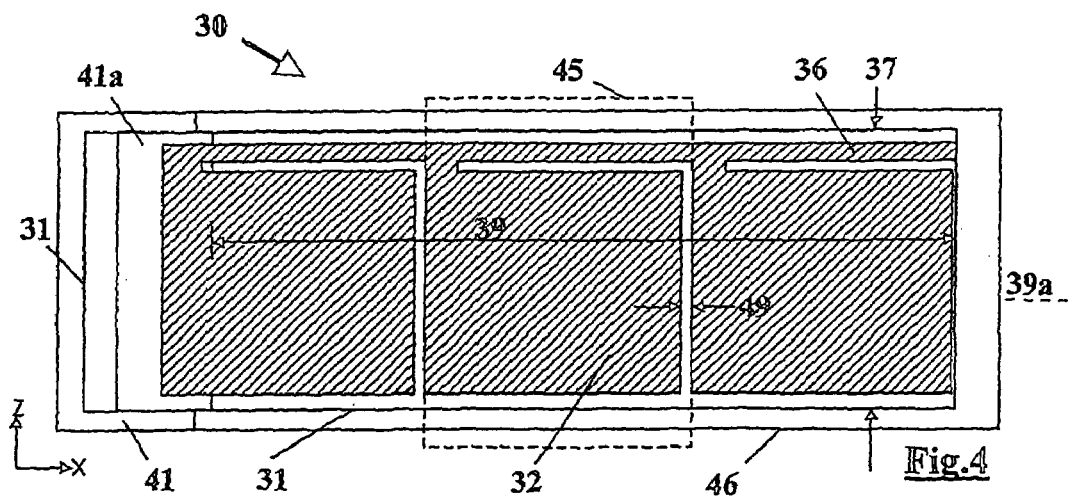

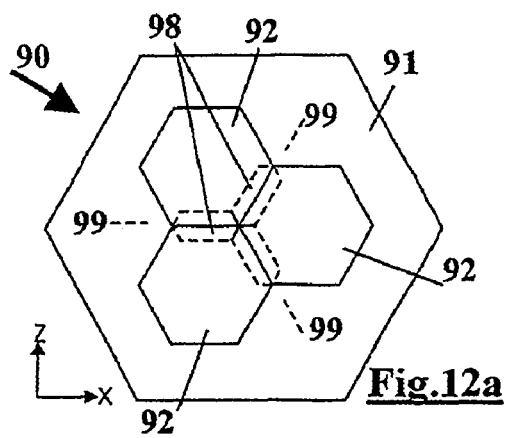
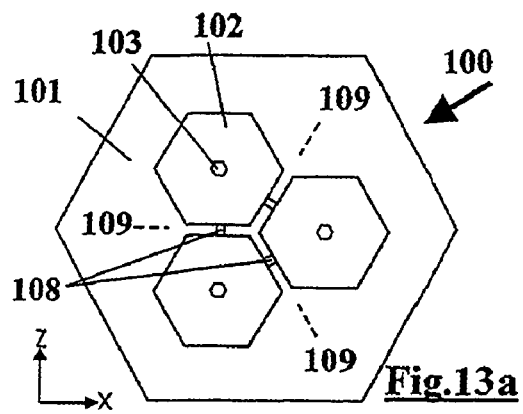
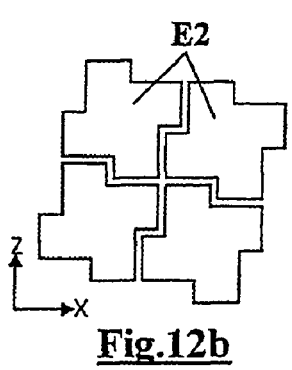
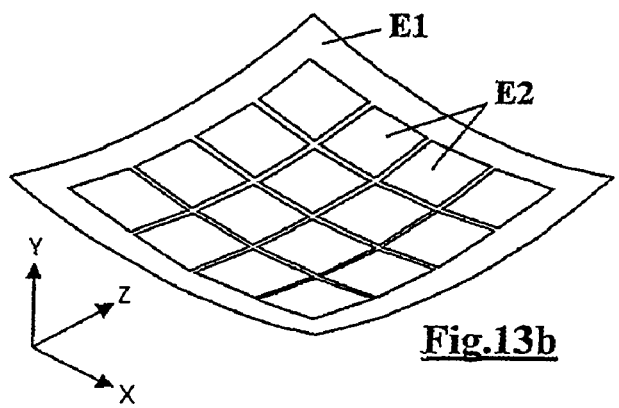
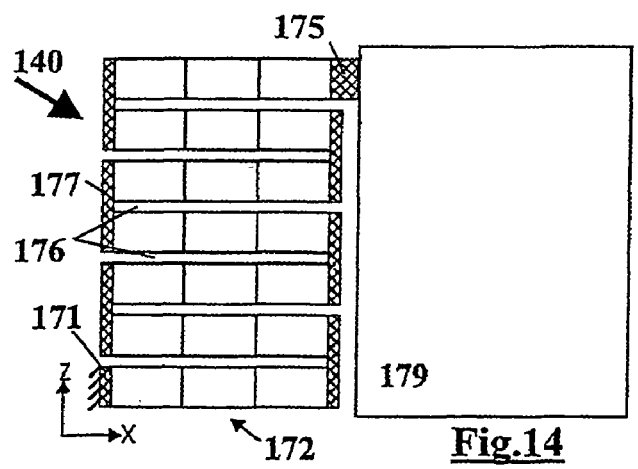

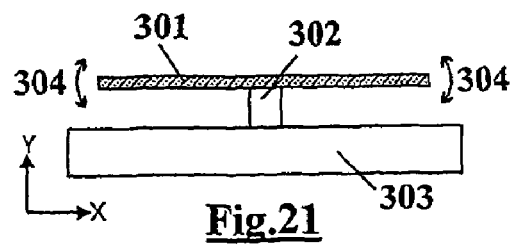
Fig. 21
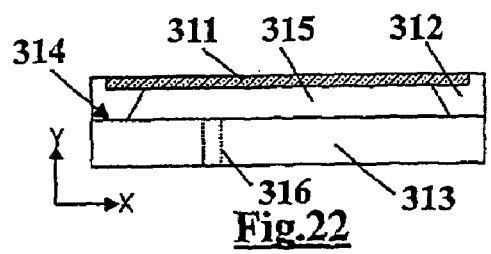
Fig. 22
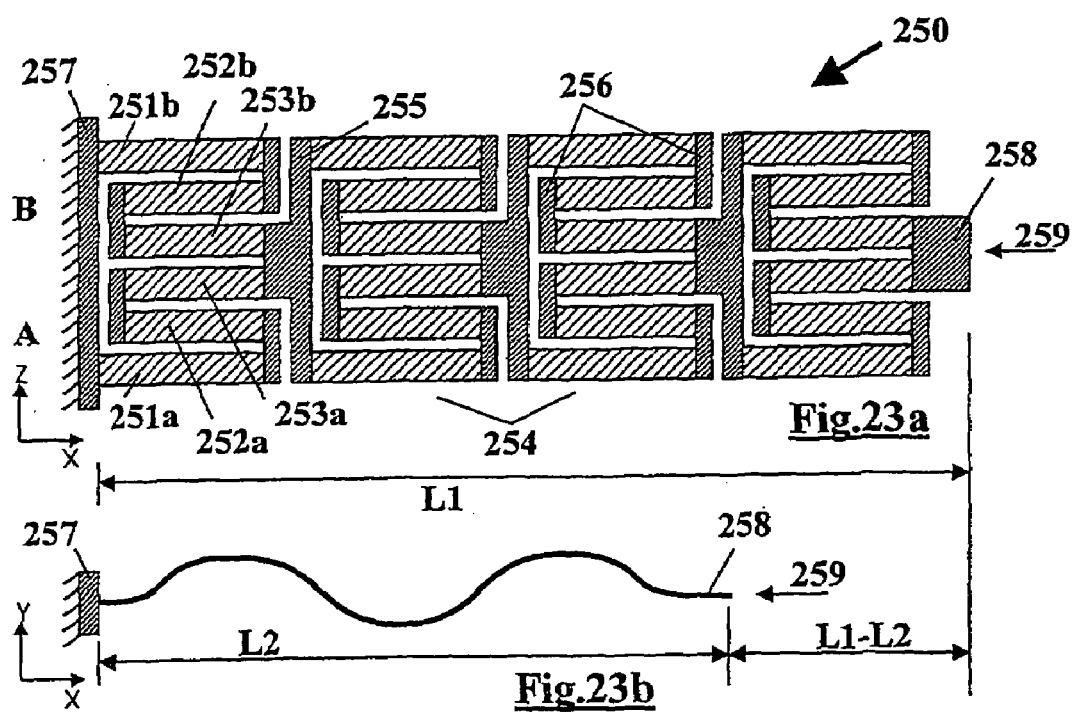
Fig. 23a
Fig. 23b

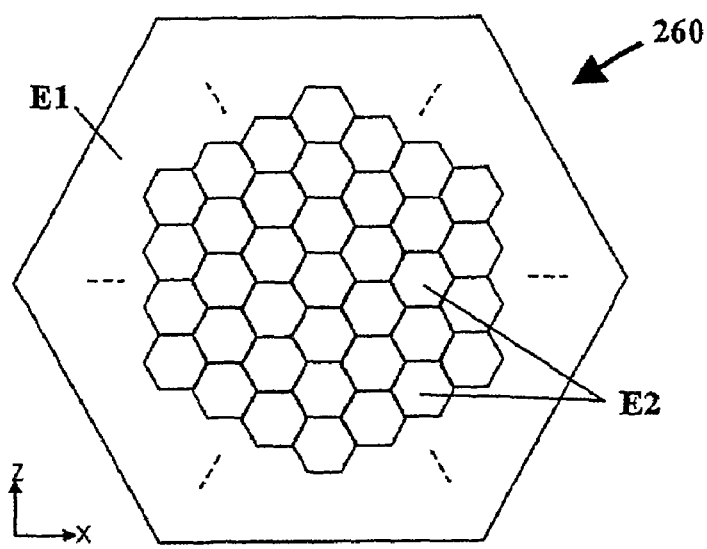
Fig.24
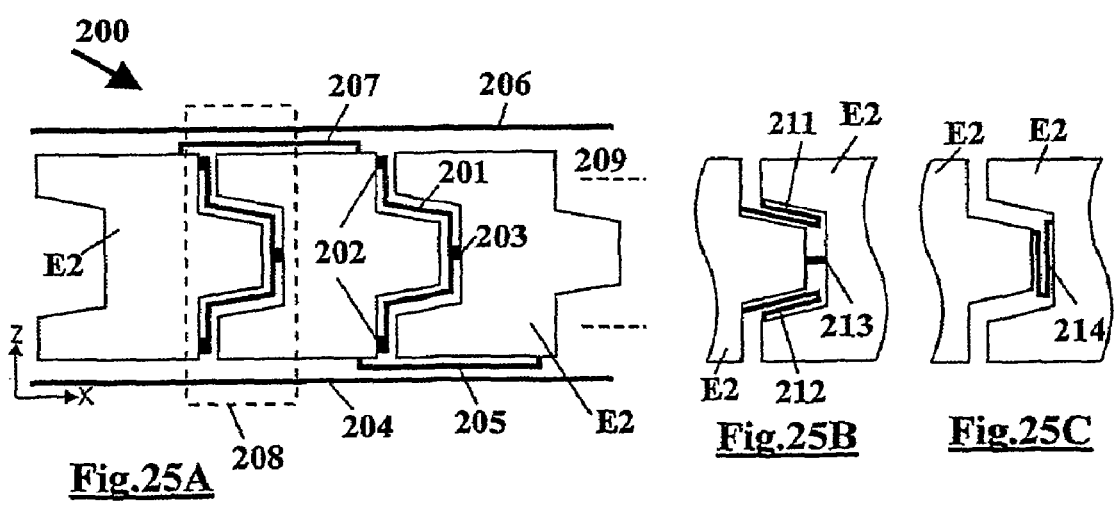
Fig.25A  Fig.25B  Fig.25C

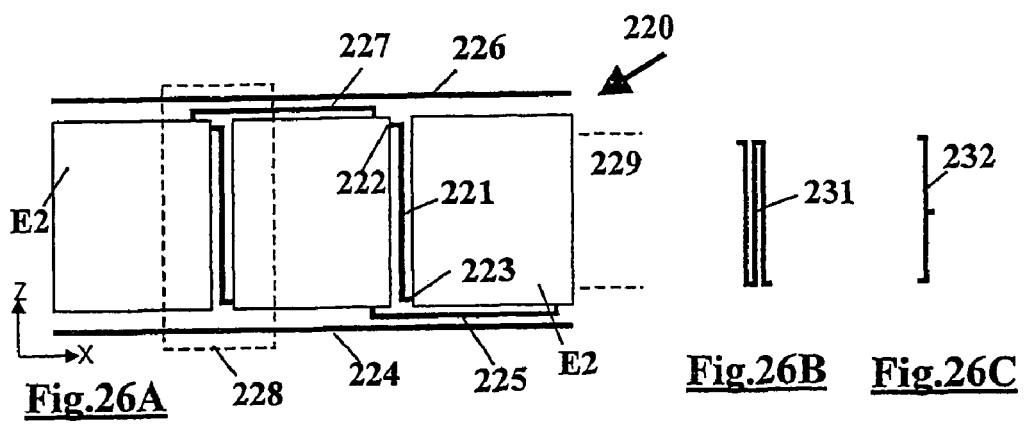
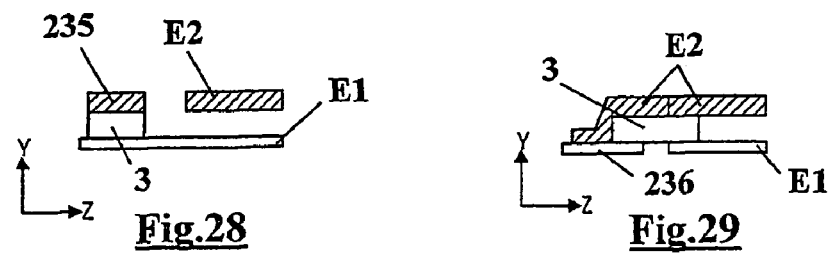
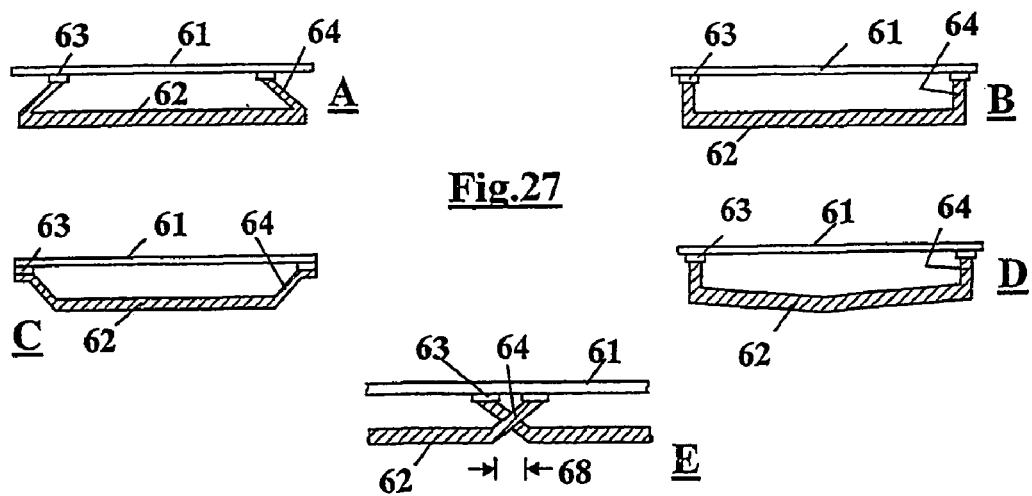
Fig.26A Fig.26B Fig.26C
Fig.28 Fig.29
Fig.27

ELECTROSTATIC DEVICE

FIELD OF THE INVENTION

The present invention relates to electrostatic devices, in particular actuators and sensors of the type commonly referred to as Micro-Electro-Mechanical Systems (MEMS) or micromachined devices.

BACKGROUND OF THE INVENTION

Generally, prior art electrostatic transducer devices, whether actuators or sensors, comprise first and second members connected to a drive voltage-source. The resulting attractive electrostatic forces cause at least one of the members to move towards the other. For this purpose, the members are normally made of conductive material, such as metals and doped-polysilicon to facilitate charging and discharging and ensure proper operation.

Prior art devices are disclosed, for example, in the "Micromachined Transducers Sourcebook" by G. T. A. Kovacs, WCB/McGraw-Hill, 1998, at pages 278 to 281, such as the classic cantilever actuator having a movable electrode suspended above a stationary counter-electrode by a gap. This suffers from the inextricable link between the gap length and useful deflection, with the latter usually much less than but not exceeding the gap itself. Larger deflections require larger gaps and consequential large voltages that are very often incompatible with standard IC drive electronics. For many applications it is highly desirable to make devices having deflections larger than the actual gap. This book discloses a comb-drives actuator which has a large number of fine interdigitated fingers producing attractive forces mainly due to fringing fields, which can produce larger movements inherently in the substrate plane. Comb-drive actuators suffer from several problems including: relatively large support/springs passive area, limited out-of-plane movement, difficulty in maintaining the desirable centrally-balanced finger positions, particularly at smaller gap widths.

Other prior art includes the article "Distributed Electrostatic Micro Actuator" by Motoharu Yamagauchi et al of Tohoku University published by IEEE in 1993, and U.S. Pat. No. 5,206,557. Both documents provide large number of members connected in series to produce larger in-plane strokes that are not inherently capable of out-of-plane motions. The stacked members effectively form long chains with normal pulling forces. Together with comb-drives, manufacture of these devices is compounded by the requirement to micromachine deep structures with narrow gaps, a difficult task likely to cause trade-off between achievable gap widths and drive voltage levels (and performance). This reduces compatibility with standard integrated circuit drive voltage levels and manufacturing.

SUMMARY OF THE INVENTION

The present invention seeks to provide improved electrostatic devices.

According to an aspect of the present invention, there is provided an electrostatic device including a first flexible electrode able to be deflected and at least one second electrode mounted on the first electrode so as to move therewith and to cause deflection of the first electrode upon the application of an electrical charge to the electrodes.

The or each second electrode works to create enhanced deflection of the first electrode upon the establishment of an electrostatic force as it moves with the first electrode. The maintenance of close proximity of the first and second electrodes allows higher electrostatic forces, power density, efficiency to be developed and/or lower operating voltages which can be maintained even at large deflections. The device can operate at drive voltage levels compatible with semiconductor integrated circuits. It can also actively transform the high force/low deflection exhibited by the prior art devices to a lower force and larger deflection (and vice versa), in effect providing built-in mechanical magnification, improving load adaptability. Moreover, the inextricable link between inter-electrode gap and deflection in prior art devices can be successfully de-coupled, allowing each to be advantageously optimised separately.

Design flexibility can be facilitated by using the number of cells N as an additional parameter for increasing deflection, and/or for trade-off between deflection and force, and vice versa. For example, if a smaller gap is used (for example, for reasons of one or more of: lower drive voltage, higher power density and efficiency), deflection may still be enhanced by increasing N.

Devices made by the teachings herein may provide relatively large out-of-plane as well as in-plane movements and deflections.

Thus, the amount of movement of the first electrode per unit of applied voltage is, increased compared to prior art devices. This can enable the device to be operated at lower voltages, even voltages typically used in integrated circuits (ICs). Thus, as well as compatibility with IC fabrication, the devices may be integrated with ICs and drive electronics (e.g. monolithically) leading to significant cost reductions.

For many applications it is highly desirable to make devices having large deflections while keeping the gap small. Furthermore, smaller gaps lead to the advantage of higher power densities, efficiencies and/or lower drive voltage levels.

In the preferred embodiment, there is provided a plurality of second electrodes located proximate one another on the first electrode. A plurality of second electrodes increases the deflection of the first electrode.

Where a plurality of second electrodes is provided, these may be arranged in a linear array or may be in any other arrangement. Where they are arranged in a non-linear array, they can produce deflections of the first electrode about more than one axis to create complex actuator or sensor movements.

In an embodiment, there is provided a plurality of second electrodes arranged on the first electrode or electrodes to provide movement of the first electrode or electrodes in opposing directions. In one example, one or more second electrodes may be located in what could be termed on the top surface of the first electrode and one or more second electrodes located in what could be termed on the bottom surface of the first electrode; such that the top second electrode(s) produce a downward deflection or movement of the first electrode and the bottom second electrode(s) produce an upward deflection of the first electrode.

Where a plurality of second electrodes is provided, these may overlap, for example by the provision of fingers which interdigitate with the fingers of the other electrode. Alternatively, adjacent rows may be staggered to effect another form of overlap.

Preferably, there is provided a common supply rail for supplying the or a plurality of second electrodes with power. Where there is provided a plurality of second electrodes to be driven in different manner, a plurality of supply rails may be provided.

The gap between the first and second electrodes may be kept under a vacuum or filled with one or more of a gas, liquid, gel or deformable solid material.

The first and/or second electrode or electrodes may have access holes for manufacturing purposes or other apertures, weakness or strengthening areas to adjust the deflection thereof. Alternatively, the first electrode may have no holes for applications as pumps and pressure sensors.

The first and/or second electrodes may be in the form of layered members including at least one conductive layer.

According to another aspect of the present invention, there is provided an electrostatic device including first and second electrodes arranged in first and second planes respectively, both of which electrodes are operable to move in a direction at an angle to the plane thereof on application of an electrical charge between the electrodes.

According to another aspect of the present invention, there is provided an electrostatic device produced by an integrated circuit or a micromachining/MEMS fabrication technique.

The invention also extends to actuators and sensors and devices incorporating actuators and sensors which use an electrostatic device as taught herein.

It is possible with the present invention to provide new types of actuators and sensors which can be operated at lower voltages making them more compatible with integrated circuits. The actuators can have improved deflection versus voltage characteristics and improved trade-off between deflection and force, and more sensitive sensors.

Furthermore, the present invention can offer more versatile and flexible actuator design parameters. It can provide devices which are capable of motions and deflections in and out of their own planes, thereby moving in three axes.

BRIEF DESCRIPTION OF THE DRAWINGS

Embodiments of the present invention are described below, by way of example only, with reference to the accompanying drawings, in which:

FIGS. 3a and 3b are side elevational views of another embodiment of actuator, with FIG. 3b showing the actuator in a deflected position;

FIGS. 4 and 5 are, respectively, plan and side elevational views of another embodiment of electrostatic actuator;

FIGS. 12a to 13b are plan views of two different embodiments of actuator able to deflect about two different axes;

FIGS. 14 to 16 show different embodiments of complex electrostatic device;

FIGS. 17 to 24 show different embodiments of actuator or sensor;

FIGS. 25A to 26C show examples of connection between supply rail and the electrodes;

FIGS. 27A to 27E show different embodiments of bridge supports;

FIGS. 28 to 29 show different examples of connection between a first conductor and a second conductor.

DETAILED DESCRIPTION

It will be apparent to the skilled person that the actuators described herein could also be used as sensors and therefore the term "device" is intended to encompass both actuators and sensors. Furthermore, on the whole the description focuses on actuators for simplicity only and it is intended that equivalent sensors are also encompassed.

In this specification, electrode E1 refers to members 1, 31, 91 and 101 described below, and electrode E2 refers to members 2, 32, 92 and 102 described below. Devices able to deflect or bend about one or more axes may be referred to herein as single axis devices, double axis devices and so on.

Figure 1:
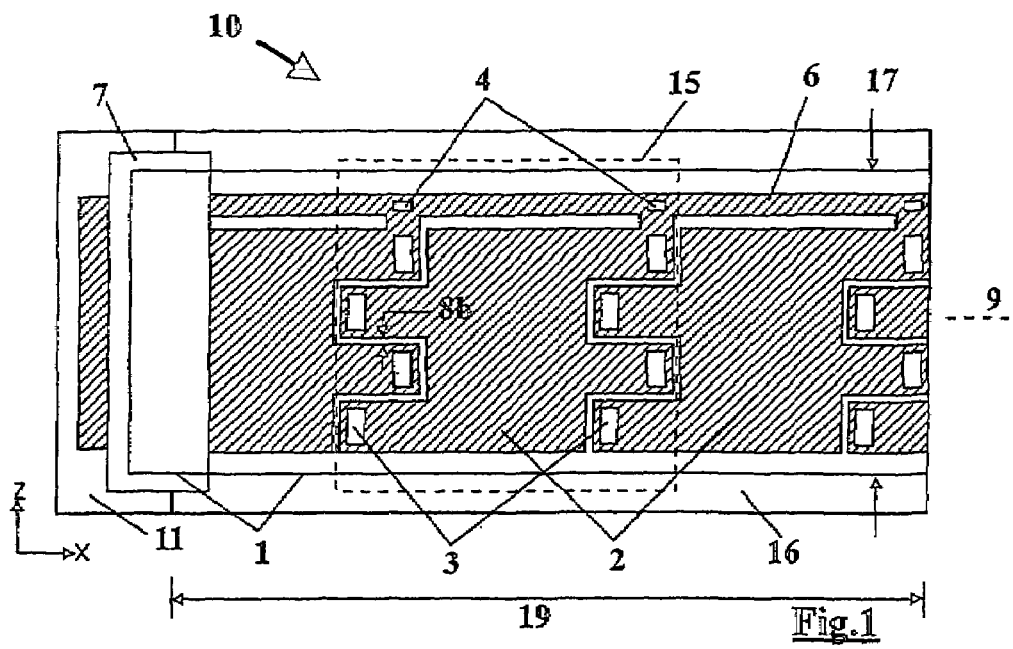
FIGS. 1, 2a and 2b show plan and side elevational views of an embodiment of electrostatic actuator.
Figure 2A:
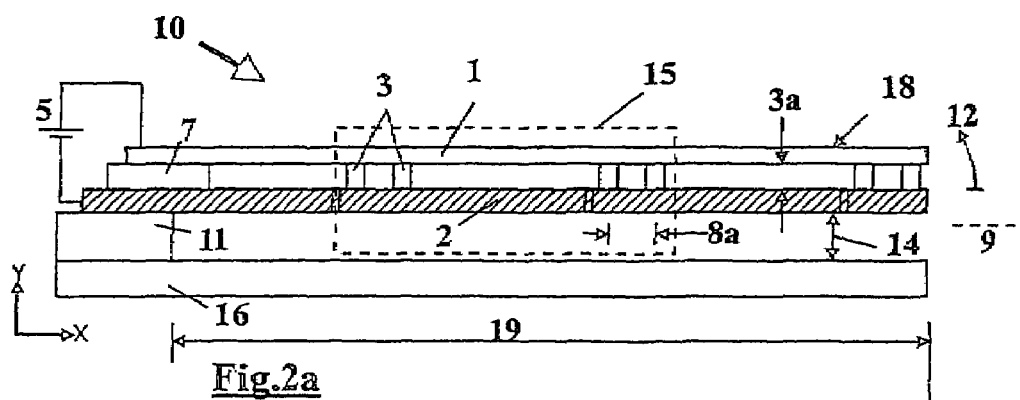
Figure 2B:
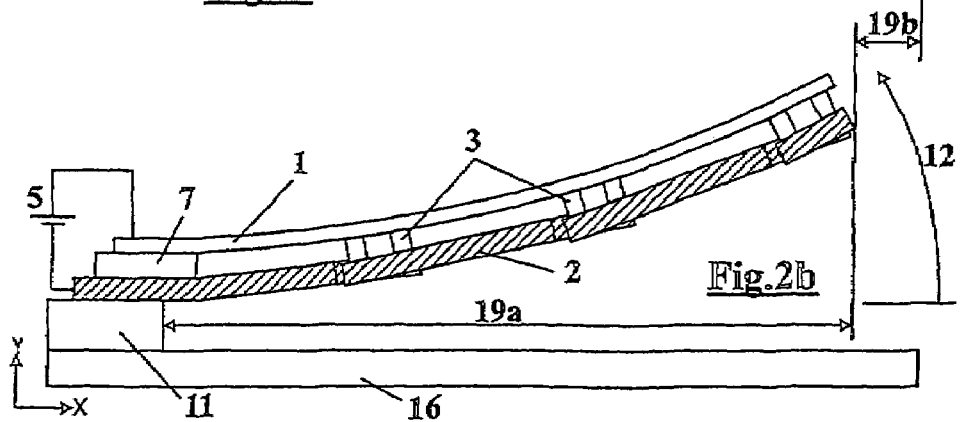

Referring to FIGS. 1, 2a and 2b the embodiment of device shown can deflect about one axis (in this example about the Z-axis). FIG. 1 shows the device in plan view, while FIG. 2a shows a side elevational view of the device. For ease of understanding, FIG. 1 shows the first layer in outline only, but is shown in solid form in FIGS. 2a and 2b.

The device 10 comprises an electrically conductive first member or layer 1 of stiffness k1 and an electrically conductive second member or layer 2 of stiffness k2 separated from one another by an electrically insulating layer 3 which provides a separation gap 3a between members 1 and 2. The members 1, 2 form first and second electrodes E1, E2 of the device respectively. Layer 3 provides support posts or anchor pads also acting as spacers maintaining gap 3a between the members 1 and 2.

The members 1 and 2 and the layer 3 form a plurality of bridge-like cells 15. An array of these cells 15 share a common first member 1 (electrode E1) and together form a flexible structure 18 which forms the main body of the device.

The member 18, which has an active length 19 and width 17, is mounted and fixed to a support post 11 raised above substrate 16 by gap 14. Thus, the member 18 is suspended above the substrate 16 and its free (cantilevered) end can move along angular direction 12 shown in FIG. 2b.

The first member 1 may be substantially continuous throughout the cells 15 while member 2 is segmented to form a plurality of individual cells 15. The cells 15 may have any appropriate length and dimensions and may be repeated further along direction 9 and/or laterally along the Z axis.

In the embodiment of FIGS. 1, 2a and 2b, the second members 2 (electrodes E2) are provided with a plurality of fingers which extend in the plane of the member and are arranged such that the fingers of adjacent members 2 interdigitate. This improves the deflection of the first member 1, as is described below. In this embodiment, adjacent members 2 are separated by gap 8b and overlap one another by distance 8a. Distance 8a may be of any desirable value and is preferably less than half a cell-length.

FIG. 2b shows the device 10 in the deflected state.

The electrical connection terminals for the members 1 and 2 (electrodes E1 and E2) are at location 11 to facilitate connection to voltage or power supply 5. Each second electrode E2 is connected to a common supply rail 6 which may be formed from the same layer.

Since electrode E1 is shared between the cells 15, its end is available at location 11 for connection to power supply 5.

Like electrode E2, member 6 may also be separated from electrode E1 (if they overlap) by anchor pads 4, similar to 3.

The mechanical properties, such as stiffness (k) and thickness (t), of the various members, the length 19 of the device 10, the length of the cells 15, the active cell bridge-length (that is between members 3) and width 17 and other relevant parameters may be appropriately chosen for the particular application under consideration and to achieve operating characteristics desired. In common with most electrostatic devices, the energy, force and power are generally proportional to the device's active area and the electric field between electrodes E1 and E2. The force may be increased by increasing the active area, such as by increasing the cell's width 17 and/or using parallel rows of cells. Moreover, the power density (and force) may be increased by increasing the electric field or if the desired voltage level is fixed, the inter-electrode gap may be reduced. The number of cells along length 19 may then be appropriately chosen in order to produce the desired deflection magnitude, using the built-in magnification capability of the device.

One example may have N=10–20 and approximate dimensions of: $t1_{(layer\ 1)}=1$ micrometer, $t2_{(layer\ 2)}=2$ micrometers and $t3_{(layer\ 3)}=1$ micrometer, these dimensions of course being dependant upon desired performance and other requirements.

When the device 10 is connected to voltage source 5, electric/electrostatic charges accumulate as a result of capacitance between electrodes E1 and E2, giving rise to attractive electrostatic forces between the electrodes E1 and E2. This causes electrode E1 to deform or curl and its free end to deflect out-of-plane along angular direction 12 as shown in FIG. 2b. The deflection magnitude is proportional to the level of applied voltage. The deflection direction is from the second electrodes to the first electrode. It can also be seen that the device's effective length along the X-axis reduces to 19a as a result of contraction by an amount 19b (explained in more detail below).

Disconnecting the power supply 5 will keep the device in its deflected state for a period of time depending on the level of electrical insulation between electrodes E1 and E2. To return the device 10 to its undeflected state, the electric charges need to be removed, for example by shorting electrodes E1 and E2 together in order for the entire structure 18 to spring back.

The total end-deflection D at 12 is the sum of the deflection caused by each individual cell 15. More specifically, each cell 15 contributes a fraction towards the total deflection D of electrode E1, and the larger the number of cells 15 the larger is the overall deflection D and length contraction 19b. This will become apparent from a consideration of FIG. 3b.

The bending magnitude depends on cell dimensions, location within the device and may further depend on load type and condition. The device 10 may produce a number of motions and forces depending on the method of mounting and/or clamping used. For example, clamping at the centre will cause the ends to deflect angularly upwards while clamping the ends will cause the centre to move downwards in a translational or linear fashion along the Y-axis. By placing electrodes E2 on the opposite side of E1, the device will deflect in the opposite direction.

Among the main general features of the device 10 are the following. Unlike the prior art, the devices have high energy density and capability by maintaining close proximity between electrodes E1 and E2 and the resulting high electric field levels. It provides unique flexibility with which the number of cells N can control the trade-off between deflection D, force F, among other variables. Generally, for a given device 10 increasing N can increase D at the expense of F and vice versa. Many prior art devices are generally forced to use high drive voltages often well beyond the desirable levels used in semiconductor integrated circuits. On the other hand, the device 10 can actively transform the high force and low relative displacement between members E1, E2 to a lower overall force F and larger overall deflection D, providing in effect mechanical magnification (and vice versa), using lower V levels.

FIGS. 3a and 3b show another embodiment of device 20 in which the second electrodes E2 do not interdigitate or otherwise overlap. Rather, these electrodes E2 are rectangular in shape and are spaced from one another by a gap 8c. If desired, an overlapping version of device 20 may be made using a number of rows of electrodes E2 with the positions of adjacent rows shifted (along the X-axis) relative to one another.

As can be seen in FIG. 3b, the deflection caused to the first electrode E1 extends over its entire length as a result of the bias to deflection caused by its major portions being deflected by the second electrodes E2. FIG. 3b also shows the upward deflection of the first electrode E1, in practice in a direction opposite the second electrodes E2.

Figure 5:
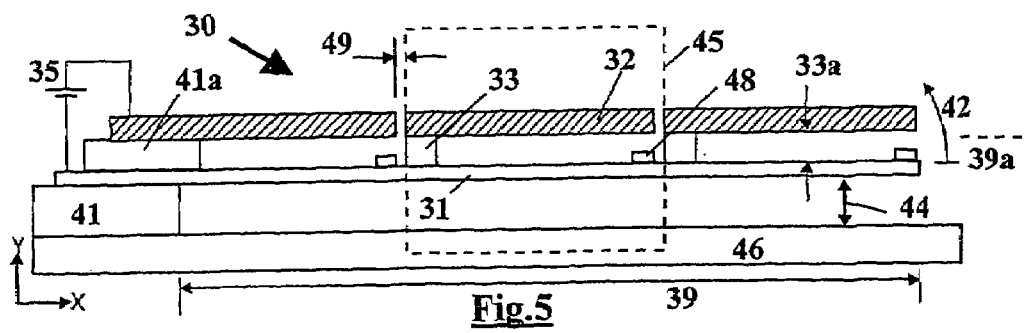

FIGS. 4 and 5 show another embodiment of device 30 which deflects about a single axis (in this example the Z-axis). In this embodiment, the second electrodes 32 are of a cantilever type, being connected only at one end to the first electrode 31.

This device 30 comprises an electrically conductive first member 31 (forming electrode E1) of stiffness k31, electrically-conductive second members 32 (forming electrodes E2) of stiffness k32, separated by an electrically-insulating layer 33 providing a separation gap 33a between the members 31 and 32. The member 31 and each member 32 with support layer 33 form a cantilever-like cell 45. It is not necessary for the support layer 33 to be located at one end of the second member 32 as it can also be located elsewhere, for example at its centre to provide two cantilevered sides sharing common anchor pad.

As with the embodiment of FIGS. 1 to 3b, an array of one or more cells 45 sharing a common first member 31 forms a flexible structure which provides the main body of the device 30. This flexible structure, with active length 39 and width 37, is mounted and fixed to support post 41 raised above substrate 46 by gap 44 and free to move out-of-plane along angular direction 42. The cells 45 may have any appropriate length and dimensions and may be repeated along direction 39a if desired.

Members 32 of adjacent cells are separated by gap 49.

Insulating landing pads 48 may be used to prevent members 31 and 32 from coming into contact with one another during deflection. The pads 48 may also have other functional purposes: for example, they can cause the second electrode E2 to change from being of a cantilever type to a bridge type upon contact with its pad or pads 48 and thus alter the type of deflection imparted to the first electrode E1. This could be useful as a limit switch or sensor.

As with the previous embodiments, members 32 are connected to supply layer 36 which may be formed from the same layer as the members 32. The first member 31 can extend to location 41 where it connects to power supply 35. Like members 32, member 36 may be separated from the first member 31 (if overlapping) by anchor pads and insulating spacers 33.

All members 31, 32, 33 may be made of any appropriate material.

The mechanical properties and dimensions, such as stiffness (k) and thickness (t), of the various members 31,32, the active length 39 of the device, the cantilever-length and the active length of a cell, that is between members 33 and width 37, among other relevant parameters, may be chosen in dependence upon application. Members 32 of adjacent cells in 30 can also overlap if desired.

When the device 30 is connected to voltage source 35, electric/electrostatic charges accumulating on the members 31,32 will deform member 31 along angular direction 42 from member 31 to members 32. Device 30 also undergoes length contraction similar to 19b of device 10 in FIG. 2b.

A cantilever-type device 30 deflects in an opposite direction to a bridge type device and, depending on the type of mounting and/or clamp used, may deflect in a number of ways similar but opposite to a bridge-type device. The bending magnitude depends on cell dimensions and location within the device, and may also depend on load type and condition. Cantilever devices generally have similar features to the bridge devices.

It will be apparent that bridge and cantilever types can be provided in the same device and indeed on the same first electrode E1.

Figure 6:
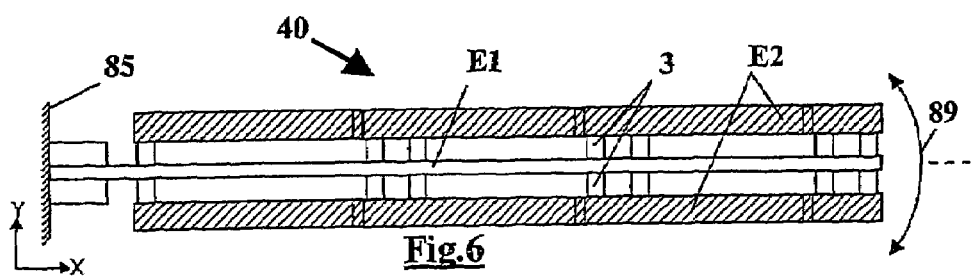
FIGS. 6 to 8 are side elevational view of three different embodiments of actuator able to deflect in two opposite directions relative to a rest position.
Figure 7:
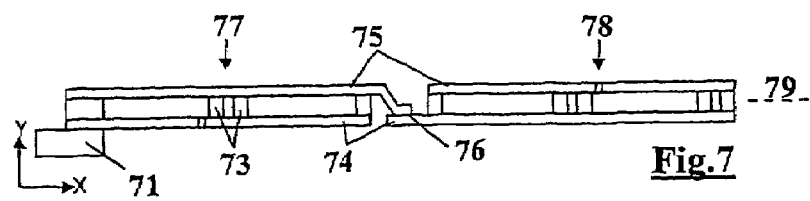
Figure 8:
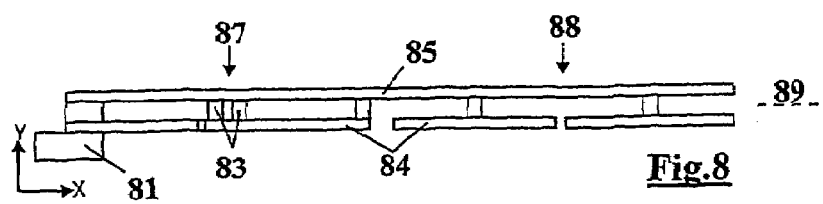

FIGS. 6 to 8 show examples of bi-directional devices. Bi-directional devices may be made using a double-sided arrangement of second members 2, 32 sharing one common member 1, 31 (respectively) in back-to-back fashion. For example, each device may have its independent electrical connection while sharing one of electrodes E1 or E2 as a common member and terminal, such that each can be turned on/off independently.

One such embodiment is shown in FIG. 6, which comprises two sets of second electrodes E2 and one common electrode E1 sandwiched between the two sets of second electrodes E2 of the bridge type. In effect, this sandwich arrangement forms two devices sharing one common electrode E1 capable of producing deflections in either direction along arc 89 while the other end of the device is fixed at 85. The device 40 (alternatively clamped via electrode E1 alone) deflects up and down if the bottom or top sets of electrodes, respectively, are actuated independently. Alternatively, two single direction devices may be coupled such that each may deflect the combined device in a separate direction.

Anchor pads 3 in the top and bottom sets of second electrodes E2 may be in alignment with each other and may have the same positions in the XZ-plane.

Other bi-directional devices may be made using only two electrodes E1 and E2 (instead of the three electrodes E2, E1, E2 as in device 40 of FIG. 6) as shown in FIGS. 7 and 8. These can use a commonly available standard fabrication process requiring only two conductive layers and one insulating layer, for example by a two structural polysilicon layer process. This flexibility allows the fabrication of different types of devices, for example some bi-directional, some upward-deflecting single-direction, some downward-deflecting single-direction or a combination of these, all using the same fabrication run or batch and/or the same substrate. Thus, one can advantageously make bridge and cantilever devices and/or devices combining both types, capable of deflecting in any single or bi-directional manner.

FIG. 7 shows an example of two layer bridge-type bi-directional device fixed to support post 71 comprising an insulating anchor pad layer 73, conductive layers 74, 75 joined at point 76. For example, an upward-deflectable part 77 can be made on the left side by making or configuring layer 74 as the second electrode E2 and layer 75 as the first electrode E1, and a downward-deflectable part 78 can be made on the right side by making layer 74 as the first electrode E1 and layer 75 as the second electrode E2. A substantially continuous first electrode E1 is formed by joining members 74 and 75 at position 76. The parts 77, 78 may have one or more independent and/or shared electrical terminal(s), and may be repeated along 79 (or other rows as in FIG. 11) to make a device of any desirable size and deflection characteristics.

It is not necessary that just the first electrodes are coupled together. An alternative is to connect electrode E1 of one device to electrode E2 of another device or to any other moveable part thereof.

FIG. 8 shows another embodiment of bi-directional device having both bridge and cantilever types of cell and fixed at support post 81. The device comprises an insulating anchor pad 83 and conductive layers 84 and 85. For example, an upwardly deflectable bridge part 87 can be made on the left-hand side by making layer 84 as electrode E2 and layer 85 as electrode E1; while a downwardly deflectable cantilever part 88 can be made on the right-hand side by making layer 84 as electrode E2 and layer 85 as electrode E1. The combined parts 87, 88 may have one or more independent and/or shared electrical terminal(s) and may be repeated along 89 (and/or in other rows as in FIG. 11) to make a device of any desired size and deflection characteristics. Advantages include: both bridge and cantilever cells use the same material/layer for electrode E1, and the same material/layer for electrodes E2; E1 and E2 are located on the same side of the device, which may be desirable in some applications.

Although layers 74, 75 (84, 85) may be configured as electrodes E1 or E2 or both, their thicknesses, however, are usually fixed and not readily controllable in a standard MEMS fabrication process. Thus, if desired and in order to optimise layers 74,75 (or 84,85) to function as E1 or E2 or both, their effective stiffness (k) may be controlled by varying the effective width of members E1, E2, for example by making holes or slits along the width to reduce k1, k2 (stiffness of electrodes E1 and E2 respectively). Electrode connections for FIGS. 7, 8 may be of any appropriate type, e.g. as shown in FIGS. 25A–29. This technique may also be used to make up/down devices in the same fabrication process.

Parts 77, 78, 87 and 88 may each comprise one or more cells.

Figure 9:
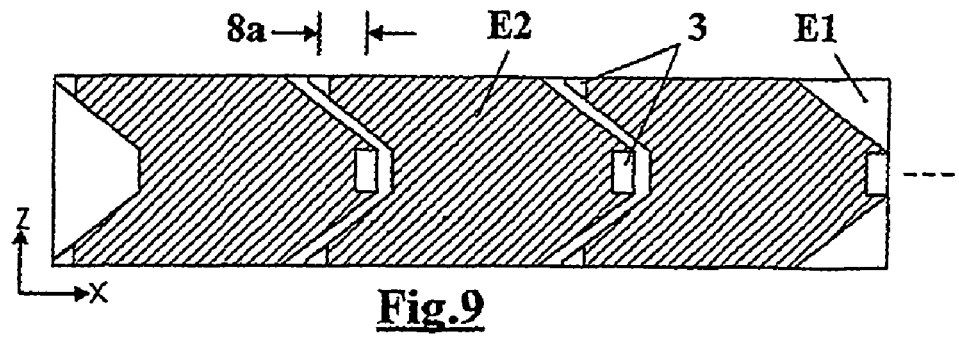
FIGS. 9 and 10 show views of two embodiments of actuator with a plurality of second electrodes in a linear array.
Figure 10:
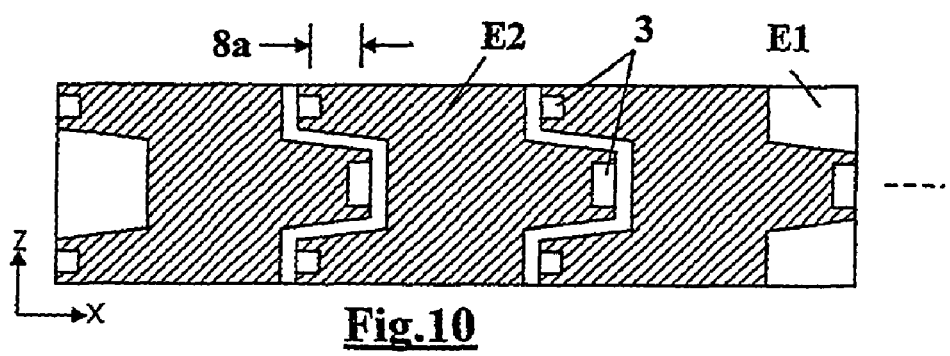

Any appropriate cell form, shape, dimension, number of overlapping parts of fingers may be used. Further examples are shown in FIGS. 9 and 10, in which a plurality of cells formed by members E1, E2 and 3 equivalent to those of the bridge device 10 with electrodes E2 overlapping by distance 8a. Electrode E1 is shown in an outline form solely for the purposes of illustration. The cell shape is not fixed and can be of any shape to produce or promote particular deflections. They could, for example, be rectangular, square, triangular, polygonal or of chevron shape. Similarly, any appropriate electrical connection (not shown) may be used, including connections of the type shown in FIGS. 25A to 29.

Figure 11:
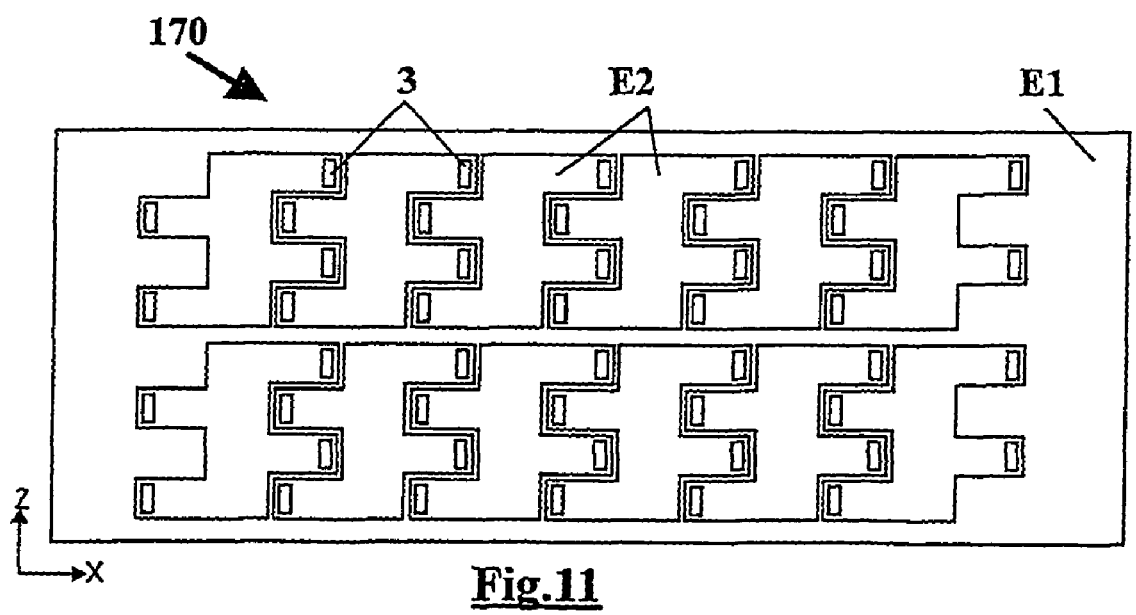
FIG. 11 shows another embodiment of complex electrostatic device.

In addition to being able to provide devices having a single row of cells, it is possible to provide devices having a plurality of such rows, one device being device 170 of FIG. 11. A common first electrode E1 may be shared by the rows. The adjacent rows may stagger relative to one another to overlap. The rows may deflect in the same or in different directions and may be independently controllable if desired.

Devices Deflectable about Two Axes

FIGS. 12a to 13b show examples of devices which are capable of deflecting about two axes on the establishment of an electrostatic force between members E1 and E2, for example about the Z-axis and about the X-axis or having deflection components about these axes. In general terms, members 91 and 101 in FIGS. 12a and 13a are the flexible electrodes E1 (shown in outline form only for ease of understanding) and could be considered similar to a flexible diaphragm.

FIG. 12a shows an example of a device 90, which can be considered similar to a bridge-type device (such as device 10 of FIG. 1). Device 90 comprises members 91 and 92 (in this example there being three members 92) similar to members 1 and 2 of the device 10 of FIG. 1, respectively. For this purpose, members 92 have an appropriate shape, in this example hexagonal, which may also have fingers (not shown) around the edges which interdigitate with its neighbours at region 98 as with the embodiment of FIG. 1. The members 92 are separate from one another and are supported on member 91 (in this example behind 91) in a manner similar to that of a bridge-type device via similar anchor pads, for example one or more per finger.

Alternatively, members 92 may be spaced out from one another by gaps similar to the embodiment of FIGS. 3a and 3b. Only three cells are shown in the embodiments of FIGS. 12a and 13a but more may be added along lines 99 and 109, respectively, in order to make arrays of any desired size, deflection and number of cells (similar to that of FIG. 24).

Instead of interdigitated fingers, members 92 may have any appropriate shape and are supported by anchor pads placed at appropriate positions such as near some or all the corners or vertices of members 92 in order to facilitate bending about two axes. Furthermore, members 92 in adjacent cells may have any desired form and degree of overlap to enhance device performance. An alternative form of members 92 is shown in FIG. 12b, each comprising four fingers which mesh or interdigitate with members 92 of its adjacent cells, and providing cell overlap along two axes.

If the member 91 is fixed at its periphery, upon actuation it will deform about the X and the Z-axes forming a curved surface with electrodes E1 and E2 located at the concave and convex surfaces, respectively. Alternatively, any other fixing method may be used, such as at the centre. Among some of its applications, the device 90 may be used in MEMS micro-speakers, microphones, micro-pumps, inkjet pumps and so on.

FIG. 13a shows an example of a device 100 which can be considered similar to a cantilever-type device, comprising members 101 (as E1), 102 (as E2) and 103. Members 102 are supported, such as at their centres, on members 101 via anchor pads at appropriate positions 103. In this example, both members 101 and 103 may be placed behind members 102 (103 are shown in front of 102 in FIG. 13a only for ease of understanding) so that device 100 can deflect in a similar direction to that of device 30. For example, if member 101 is fixed at its periphery, then upon actuation it will deform about the X and the Z-axes forming a curved surface with electrodes E2 and E1 located at the concave and convex surfaces, respectively. This type of deflection is shown in FIG. 13b, which uses square-shaped electrodes E2 and E1 with electrode E1 fixed at its corners (and it will be apparent that the embodiments of FIGS. 12a and 12b will deflect in like manner).

The cells may overlap if desired.

As with device 90, the region between adjacent cells in device 100 may contain one or more electrical interconnections, for example connections 108, as described herein. Similarly, the second members 92 or 102 (constituting the second electrodes E2) could be powered together or separately in dependence upon application. Device 100 has similar applications to that of device 90.

Only three cells are shown but more cells may be added along lines 109 to make an array of any desired size and number of cells. Similarly, the devices 90 and 100 and electrodes 91, 101 may have any desirable and appropriate shapes, for example hexagonal (as in FIG. 24) circular, square, even non-symmetrical.

A bi-directional device deflectable about two axes may also be made by duplicating members 92,93 on the other side of member 91 in device 90, and duplicating members 102, 103 on the other side of member 101 in device 100.

The skilled person will recognise that techniques similar to that used in FIGS. 7 and 8 may also be used to make double axis devices of the bridge-like, cantilever-like or a combination of both in the same device, which are capable of deflecting in a single or bi-directional manners using a two structural electrodes fabrication process.

Other embodiments which can move about two axes may be made by using two devices which each move about a single axis coupled to one another at an angle. They may be provided with shared or independent terminals for control. For example, device 140 of FIG. 14 may be modified to make a device movable about two axes by orienting one or more rows at 90° to one or more other rows in the same device. Upon actuation, each device will cause deflection about one axis. Device 180 shows another example which can also deflect about two axes. Electrodes E1 may have slits, apertures or holes to further promote or enhance operation.

Complex Devices

It is also possible to create complex devices formed of a plurality of sets of second electrodes either on a single first electrode or on a plurality of first electrodes. In the former case, the first electrode can be made to deform in complex manners to provide complex types of movement of one or more device attached thereto or for use in speakers, microphones, pumps and so on. In the latter case, intricate types of movement can be provided, for example by coupling together devices of the types described above with reference to FIGS. 1 to 13b and 23a to produce complex movements about one or many axes and/or translational motions along one or many axes. The number of axes about which a device can deflect is theoretically unlimited and will be chosen in dependance upon the application and desired deflection characteristics.

The different types of cell described above can also be combined together, for example, bridge-type and cantilever-type cells can be combined; cells deflecting about one or two axes can be combined, as can reverse direction, bi-directional or any other combination, to provide movement with any desired angle and direction of motion. Furthermore, one or more sections may have separate and independent electrical terminals to be independently driven, or may share one or more electrical terminals. Such combined devices provide unique features using standard fabrication processes to provide complex articulated structures achieving functions hitherto too complex or difficult to achieve. Some examples of optical-scanners and beam-steering devices are shown in FIGS. 14 to 19. These find applications in 2D and 3D optical switches used in telecommunication such as all-optical-switching, fibre-optic switching and optical cross-connect (OXC).

Appropriate drive and control electronics and techniques known to those skilled in the art may be used to obtain sophisticated motions and deflections, which may be desirable in these applications and others such as micro-manipulators and robotics. The low-voltage capability allows these devices to be integrated with drive electronics monolithically with significant cost reduction such as in devices capable of optical switching between large number of fibre-optic channels. These devices may be used to deflect coherent and/or incoherent electromagnetic waves, e.g. light, about one or more axes.

FIG. 14 shows an example of a complex device 140 capable of turning/twisting, comprising a plurality (in this example seven) devices 172 each deflectable about a single axis, connected/mounted via members 177 in series, such that each of device 172 is carried by and moveable with the preceding device. Device 172 (separated from its neighbours by gaps 176) comprises a number of cells (for example three) and is capable of deflecting in the opposite direction to its adjacent device. The complex device is mounted/fixed at 171, leaving the other end 175 free to deflect (in this example about the Z-axis). End 175 may be connected to any desirable load, for example a mirror 179, or to any other electrostatic device. When switched on, mirror 179 can be twisted/deflected by relatively larger amounts, the total angle being the sum of the number of individual devices used and the number of cells in each, and also on the magnitude of V, among other variables. Clockwise and counter-clockwise turning may be obtained depending on the device direction.

Another device, such as device 10 (or other single or multiple axes devices), may be mounted on 175 (instead of 179) in device 140 to enable the first device to deflect about a different axis depending on the turning angle imparted by 140 when appropriately actuated (10, 140 may be jointly or independently controlled). For example, if the turning angle is near 90°, then device 10 can be deflected laterally in the XZ-plane. The latter deflection types can alternatively be achieved by using a device disposed in a plane normal to the substrate (XZ-plane). Other in-plane devices are shown in FIGS. 23a and 23b.

Figure 15:
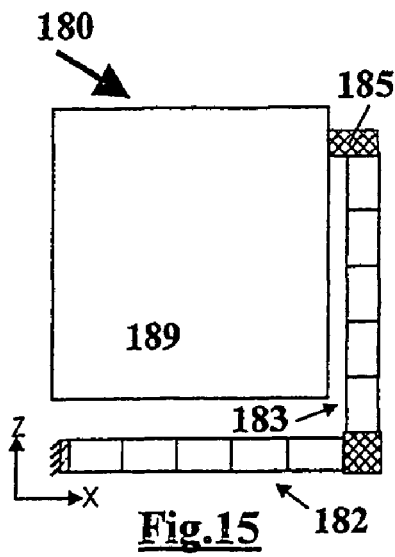

FIG. 15 shows another example of an "L-shaped" complex device 180 comprising two individual devices 182, 183 of any desired number of cells. Device 183 is mounted on and moveable by device 182 and both may be independently controllable. As in FIG. 14, end 185 may drive an appropriate load, such as a mirror 189. When individually switched on, device 182 can twist and deflect the mirror around the Z-axis, while device 183 can deflect the mirror around the X-axis. Switching both device 182, 183 by various amounts may enable the mirror to deflect with components resolvable about all the three XYZ-axes. For example if device 182 deflects by 90 degrees, it will now enable device 183 to deflect about the Y-axis (Y-axis being normal to the page). Instead of mirror 189, one or more electrostatic devices may be mounted on device 180 (e.g. at 185) to enable even more complex motions.

Both complex devices of FIGS. 14, 15 and 17 to 19 may be used in light scanning/steering applications and OXC switches.

Figure 16:
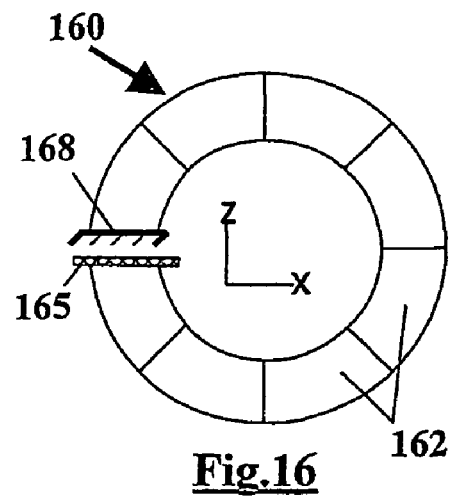

FIG. 16 shows a device 160 formed from a plurality of curved cells 162 is an annular shape with one end secured to a support 168 and the other end carrying a member 165 to be moved. The member 165 may move a load attached thereto. As with the other embodiments described herein, that of FIG. 16 could be formed with any type of device, including a bi-directional device. Similarly, other shapes and paths such as rectangular, triangular, spiral may also be made if desired.

Figure 17:
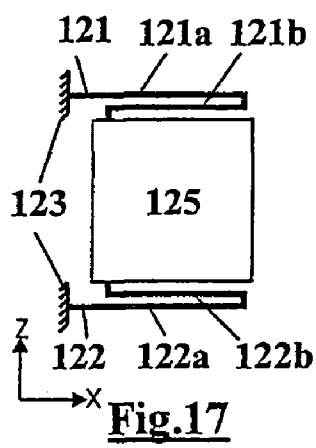

The embodiment of FIG. 17 comprises two complex devices 121,122, one on either side of element 125. Element 125, which may be a mirror, is mounted at the deflectable-end of elements 121,122, with other end fixed at 123. The device may comprise two parts 121a, 121b able to deflect in one or more same or opposite directions. A number of drive schemes may be used to move the mirror in a variety of ways. For example, if members 121a, 121b, 122a, 122b all deflect upwards (out of the page) by equal amounts, the mirror will move linearly upwards, while with non-equal deflections the mirror can be tilted towards the least-deflected side. Deflecting only one of members 121 or 122 tilts the mirror to one side. Mirror 125 may also be tilted towards the left and right of FIG. 16 if members 121b, 122b are deflected in the opposite direction to members 121a, 122a respectively. Many other drive techniques known to those skilled in the art that may be used to achieve these drive schemes.

Figure 18:
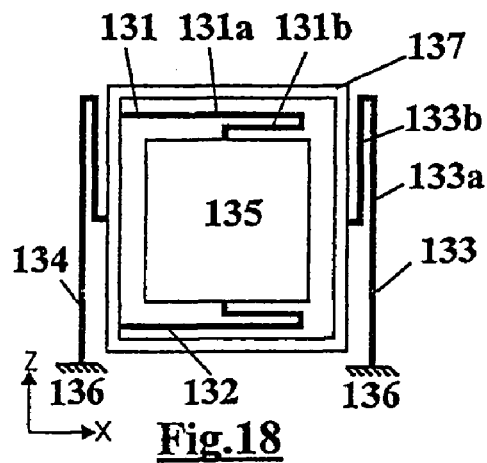

FIG. 18 shows an even more versatile embodiment using four devices 131,132 (complex, single axis and/or bi-directional) supporting a load, for example mirror 135, at one end and fixed to frame 137 at the other ends with devices 133,134 supporting frame 137 at one end and fixed to anchor points 136 at the other end. Again, similar drive techniques as described for the embodiment of FIG. 17 may be used in order to move, deflect and/or tilt mirror 135 in/about one or more axes.

Figure 19:
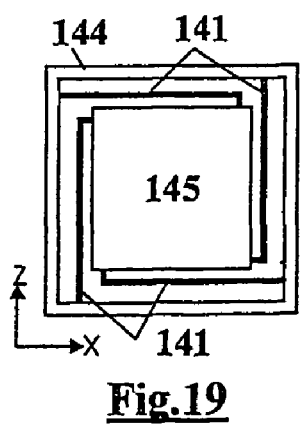

Another embodiment is shown in FIG. 19 comprising four devices 141 (complex, single axis and/or bi-directional), supporting, for example, mirror 145 at one end and fixed to frame 144 at the other end (144 is appropriately supported). As with the previous embodiments, mirror 145 can be moved in linear and/or angular fashion by appropriately activating one or more of 141 by techniques known to those skilled in the art. The mirrors in FIGS. 17 to 19 may overlay the devices thus hiding them underneath, which may be advantageous in maximising the mirrors' active areas.

Figure 20:
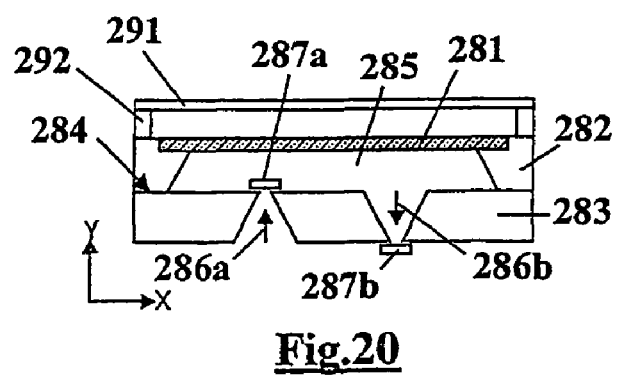

The devices may also be used in fluidic applications such as pumps and inkjet printer cartridges. An example is shown in FIG. 20 comprising a double (or single) axis device 281 of appropriate shape, for example circular, which is fixed at its periphery to a supporting (frame) member 282, which may be of back-etched silicon. Device 281 is preferably of the sealed-type, that is with a continuous first member E1 forming an impervious membrane without holes, which may also be capable of bi-directional actuation. E1 may preferably face cavity 285. Another member 283, which may be of glass or silicon, containing an inlet and outlet ports along 286a and 286b, (e.g. funnel shaped) respectively, is appropriately bonded at 284 to member 282 forming a cavity 285 in between.

If desired, two one-way valves 287a, 287b may be used at the inlet and outlet ports, respectively, to direct fluid flow as indicated by the arrows. Membrane 281 may be capable of up and/or down motions. Upwards movement causes cavity 285 to expand and sucks fluid in, while downwards movement causes it to contract and push fluid out. Thus, the pump can move fluid from the inlet to outlet ports and through the conduits connected thereto. The device may operate in a continuous oscillating or vibrating fashion, and/or be capable of fast on/off actuation.

An additional environmental protection membrane 291 can be suspended above member 281 by member 292 without adversely interfering with the proper operation of member 281. In this and other applications, a similar environmental protection member may be used which may also be mounted on (and moveable by) the device 281 via appropriate support posts.

The device may also be used in acoustic applications such as speakers, earphones and ultrasonic generators. For example, the embodiment of FIG. 20 without bottom member 283 may be used as a speaker or ultrasonic generator when driven with appropriate signals. The top protective membrane may also be used if desired, in which case it may be preferable to make the second electrodes E2 face member 291.

The embodiment of FIG. 21 may alternatively be used as a speaker or ultrasonic generator (which may provide simpler fabrication) and comprises a device 301 fixed to support member 302. Member 302 is in turn fixed to substrate 303. Upon appropriate actuation, the device can deflect along direction 304 to generate acoustic waves.

The devices may be used in sensor applications such as pressure sensors and accelerometers. An example is shown in FIG. 22, which comprises a double (or single) axis device 311 of appropriate shape, for example circular, which is fixed at its periphery to a supporting (frame) member 312, which may be back-etched silicon. Device 311 is preferably of the sealed-type, that is with a continuous first electrode E1 forming an impervious membrane without holes. Electrode E2 preferably faces cavity 315. Another member 313, which may be of glass or silicon, is appropriately bonded at 314 to member 312 forming a sealed cavity 315 therebetween. Cavity 315 may be maintained at a desired reference pressure, for example vacuum, by appropriate means. Device 311 is capable of deflecting up/down in response to outside pressure variation relative to cavity 315 and the pressure therewithin, leading to variation in capacitance in the device 311, which can be used for absolute pressure measurement by an appropriate electronic detector. The cavity provides environmental protection of electrodes E2 of member 311, thus may alleviate the need for an additional protective member (291 in FIG. 20), although such a member may still be used if desired. For differential pressure and gauge applications, a port 316 may be used to facilitate such pressure measurements.

Acoustic microphones and ultrasonic detectors may be made using a similar embodiment to that of FIG. 22 (e.g. without member 313) to sense and detect acoustic waves. Alternatively, they may be made using similar embodiments to FIGS. 20 (without member 283) and 21.

Similar devices to those of FIGS. 21 and 22 may be used as accelerometers, which may carry an appropriate additional mass to facilitate sensing, for example formed by appropriate bulk-etched silicon. The pressure and acceleration sensor devices may also be used as force-balance sensors benefiting from the sensing and actuation capabilities of the devices of the invention, using drive techniques and methods known to the skilled person.

Other embodiments of complex device are capable of producing linear motions and forces along directions substantially parallel to their own planes using the length-contraction effect explained above. One example is device 250 of FIG. 23a, which lies in the XZ-plane. Device 250 comprises a number of sections 254 connected in series such that each one is mounted on and deflects (the member 255 attached to it) in the opposite direction to the preceding one. The use of two sections deflecting in opposite directions enhances the device's in-plane movement, while reducing the out-of-plane movement. Device 250 comprises two halves (may be symmetrical), A at the bottom and B at the top. Halves A and B are used to produce more uniform and stable displacement 259, although only one may be used. Therefore, only half A is described in detail. Each section 254 comprises three devices 251a–253a connected in series and forming a twisting type device similar to that of FIG. 14 (arms 251a, 253a may deflect upwardly and arm 252a downwardly). When activated, 251a–253a's angular deflections are added to produce a maximum deflection at the end of any 253a and member 255 attached thereto. Only deflection of the members 253a and 253b are shown in FIG. 23b for clarity. Members 255–258 may be of any appropriate material.

When activated device 250 can deform and contract in the manner shown in the side elevational view of FIG. 23b. In practice, member 253a drives member 255 of the next section and so on, thus leading to device 250 wrinkling and thereby to contract. The contracted length L2 of device 250 is shorter than its undeformed length L1. Device 250 can be used to pull a load attached to its end 258 substantially along direction 259 when its left end is clamped at 257.

Upon deactivation, device 250 may spring back to its original length L1.

Device 250 may have additional supporting/stabilising members, such as tethers or guides, and may be appropriately attached to a load without allowing undesirable deflections, for example to keep clear of the substrate. Odd and even members 254 may be capable of simultaneous actuation (sharing one or more electrical terminals) or may each be capable of independent actuation. In the latter, a differential drive may also produce additional up/down net deflections if so desired. Although three sections (251a–253a) are shown, any number may be used and each may comprise one or more cells of the type taught herein. If desired, the device 250 can be maintained at a safe distance away from the substrate by making the upward-deflecting 254 members of larger deflections than the downward-deflecting ones.

Other examples of contraction-type complex devices may be made by forming devices with one or more cells deflecting in opposite directions to one another, such as those of FIGS. 7 and 8. If desired, contraction devices may be disposed in a plane normal to the substrate.

Devices capable of in-plane linear motions or contraction along two axes substantially parallel to their plane are also envisaged. FIG. 24 shows an example of a double axis device 260 disposed in the XZ-plane, comprising electrode E1 and electrodes E2 of appropriate shape and anchor pads (not shown). The device may have two groups of cells, each capable of deflecting in the opposite direction to the other (using techniques similar to those of FIGS. 7 and 8). More cells may be added to make devices of any desired size. The device may initially be flat and deform upon actuation so as to contract substantially along two axes, in this example in the XZ-planes. Appropriate electrical connections similar to those shown in FIGS. 25A–29 may be used. Other details may be similar to the embodiment of FIGS. 12a to 13a.

Furthermore, a double axis length-contraction device may be made using a plurality of single axis devices. For example, one such device may comprise a common E1 electrode in the XZ-plane, having a plurality of E2 electrodes disposed radially outwards across the circumference of one or more imaginary concentric circles of progressively larger radii. Each set would lie across its own circle and deflect in the opposite direction to the adjacent inner and outer sets, so as to provide radial contraction.

Some of the applications of device 260 include: 2D linear motions for 2D actuators, artificial muscles, membranes having variable/controllable stiffness, and 2D sensors.

In both devices 250 and 260, the load acted upon may be spring-loaded or mounted such that it may spring back upon de-actuation, alternatively two devices may pull in opposite directions.

Other in-plane linear motions devices may also be made using two or more devices of the type 250 disposed at an angle to each other such as 90°, each capable of contracting substantially in a single axis.

Complex devices containing both in-plane and/or out-of-plane devices to generate complex motions, such as three dimensional (3D) motions, may be made. For example, a membrane-like device capable of substantially linear 3D movements may be made comprising electrode E1, on which a number of sets of electrodes E2 are mounted to produce in-plane motions about two axes, and some out of plane motions about a single axis. Each set may be independently controllable. This finds applications in robotics, positioning, alignment and 3D optical stages and so on.

Embodiment 250 may be used in a number of applications requiring movement in one or more axes, such as artificial muscles, solenoids, electrostatic comb-drives and thermal actuator replacements. In other applications, the linear displacement or motion may be converted into rotary motion such as by cranking of a rotary wheel, the wheel having an offset pin where the linkages from the actuators may be connected in order to impart rotation on the wheel by the actuators' linear motions. Two such actuators may be disposed at 90° to each other so when driven with appropriate voltage signals (for example, 90° out of phase sinusoidal wave) they can cause continuous rotation of the wheel. The wheel may have gear teeth that may cause other wheels/gears attached thereto to drive a load.

Another form of complex device includes one or two dimensional arrays containing two or more electrostatic devices of the types described whether deflecting in-plane (e.g. linear or contraction) or out-of plane (e.g. linear and angular), which can be used in variety of applications. For example, each device may carry and move in scanning motion an element such as a transmitting or receiving antenna for wireless communications and optical arrays for directing, transmitting and receiving of electromagnetic radiation. They may also be used for the detection of signals such as acoustic waves, in which case an actuating version of the device can direct and scan a sensor version of the device or any other sensor over the reception angular range to achieve best reception conditions.

In other embodiments, one or more devices set up as actuators may be connected in parallel or series or a combination of both in the same plane. Alternatively, two or more actuator devices movable about one or more axes may be stacked on top of one another in different parallel planes such that they are appropriately supported (e.g. by using additional support member/post and/or flexible sheet or laminate of appropriate material), in adjacent devices, on top of one another without impeding each other's deflection, with the resulting device having improved performance, for example providing larger forces.

An example of another stacking embodiment comprises a device similar to that of FIG. 6 except that one actuator (for example the top actuator) may be of another type, for example cantilever. Since bridge and cantilever type devices deflect in opposite directions, in this case they will both move in the same direction, thereby to produce larger forces.

Electrical Interconnections

Electrical connections/interconnections of corresponding electrodes in any cell or between the various members and devices may be made by a variety of techniques, some of which are shown in FIGS. 1, 4, 25A to 26C (the first electrode E1 is not shown in these Figures for the purposes of clarity). These are shown for single axis devices, but can be easily adapted or applied by those skilled in the art to double axis and complex devices, for example, by appropriately routing and distributing the electrical connections throughout the device. These connections are preferably made relatively flexible without adversely affecting the desired performance of the device or undesirably restrict useful deflection and extend from the base support of the device. They can use materials and techniques known to those skilled in the art, for example the same materials as electrodes E1 and E2 or other materials such as a metal layer of appropriate thickness and dimensions. The interconnections may be situated between, along the sides of, above or below the cells. They may be freely-suspended or may be supported (for example, by spacers 3) at appropriate points in order to prevent them from contacting the opposite polarity electrode. Normally electrodes E1 of the cells are already connected together as a continuous member but if not (such as in a complex device) any appropriate method as that described for electrode E2 may be used.

In FIG. 25A a bridge type device 200 comprises a number of cells in which electrodes E2 are interconnected by flexible member 201. Member 201 connects electrode E2 in the preceding cell via connections 202 to electrode E2 of the next cell via connection 203. FIGS. 25B and 25C show other examples of connections, comprising members 211 and 212 together with member 213 or member 214 of FIG. 25C.

FIG. 25A also shows alternative connections located on the sides of the cells such as 205 and 207 and/or 204 and 206. One or more of the latter connections may be used to facilitate connections to one or more devices, particularly in a complex device, by techniques known to the skilled person to facilitate inter-device electrical connections.

FIG. 26A shows examples of flexible connections for a cantilever type device 220 using member 221 connecting electrode E2 in a preceding cell at point 222 to electrode E2 in the next cell at point 223. Members 231 or 232 in FIGS. 26B and 26C, respectively, show alternative connections to 221 of FIG. 26A.

FIG. 26A also shows connections 225 and 227 and/or one or more of 224, 226 on the side of the device, having similar functions to those shown in FIG. 25A.

FIGS. 28 and 29 show cross-sections across a device showing two examples of implementing the electrical connections situated on the sides of the device and how they may be carried and supported. FIG. 28 shows an independent connecting member 235 (similar to members 204, 206 and 224, 226), while FIG. 29 shows how to use part of the material of the other electrode (for example, E1) to interconnect electrode E2 (or vice versa) via member 236.

FIGS. 27A to 27E show different examples of cells of the bridge type. They all include first and second members 61 and 62 and an insulating member 63 similar to the members 1, 2 and 3 of device 10 of FIG. 1. Members 62 and 64 may constitute a single member or two and may have the same or different stiffnesses, thicknesses and material. Member 62 may be curved, as shown in FIG. 27D. FIG. 27E shows a bridge connection which provides electrode overlap of magnitude 68.

Electrical interconnections may alternatively be situated above or below the device in such a way that they are appropriately supported, preferably on electrode E2, and carried along on the device (with appropriate flexible members between the cells) for the purpose of supplying electrical connections to one or more devices, and/or one or more additional devices carried/activated/deflected by a device. Individual devices can be independently actuated in this manner.

Instead of permanent attachment to the substrate, the devices may also be detached from the substrate after fabrication and may then be appropriately assembled into any desired form (e.g. a complex device) and mounted on alternative supports or may be used individually.

Detached devices may subsequently be appropriately attached (e.g. by bonding or gluing) to a load (or support). In some embodiments, the electrostatic device may not be attached to any substrate but may simply be connected to a power source via flexible leads.

Fabrication

Any suitable process and materials known to those skilled in the art may be used to fabricate the devices described herein, including: MEMS or MOEMS (such as multi-user MEMS Processes "MUMPs"), IC and semiconductor processes, microelectronic and silicon processes, LIGA/S-LIGA, thin film, electroplating, fabrication by printing processes, on silicon, glass, plastic or other substrates.

Figure 30A:
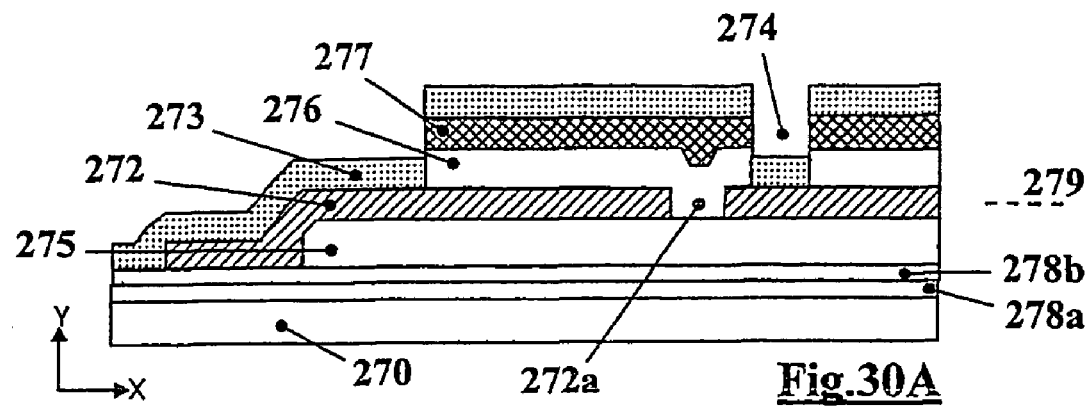
FIGS. 30A to 30C show an embodiment of method of manufacture of an actuator as herein described.
Figure 30B:
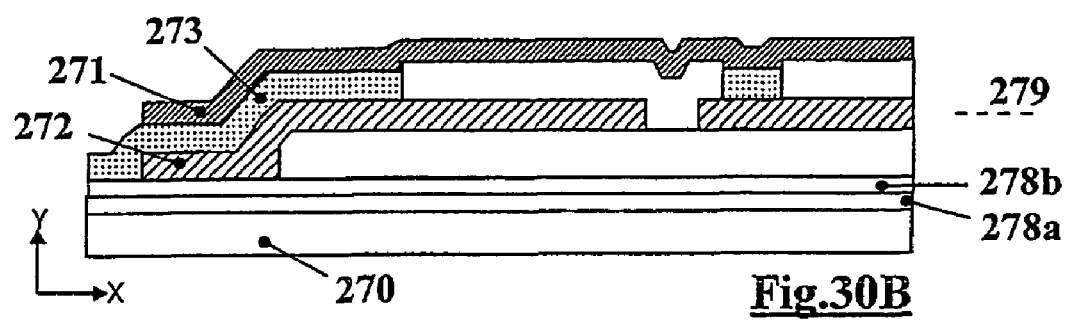
Figure 30C:
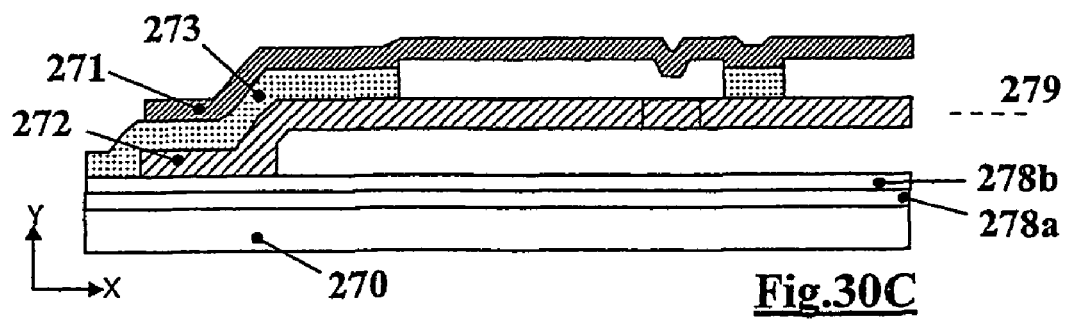

FIGS. 30A to 30C show an example of the main fabrication steps for part of an upwardly deflectable device similar to device 10 of FIG. 1, using standard microelectronic techniques and processing. Some standard MUMPs processes, such as the Cronos Integrated Microsystems, may not readily provide as standard a functional insulating layer between the two moveable structural polysilicon layers. This additional layer may be formed at the appropriate stage during the fabrications process as explained below.

The process starts with a silicon substrate 270 usually having a silicon nitride layer 278a deposited by, for example LPCVD, followed by the deposition and patterning of a polysilicon layer 278b if desired. A first sacrificial layer 275 (such as phosphosilicate glass "PSG") is then deposited, for example by LPCVD, and patterned as desired. A first structural polysilicon layer 272 is then deposited, doped, annealed and patterned in accordance with desired second member E2 pattern. A second sacrificial layer 276 (such as PSG) is deposited, for example by LPCVD. A photoresist layer 277 is then laid and patterned with openings 274. Exposed parts of layer 276 are then etched away. An insulating layer 273 is then deposited by an appropriate technique to form the anchor pads inside holes 274, followed by the removal of unwanted parts of 273, for example by lift-off after stripping 277. Layer 273 is preferably resistant to the sacrificial layer etchant. A second structural polysilicon layer 271 is then deposited, doped, annealed and patterned in accordance with desired first member E1 pattern, as shown.

Standard processes normally use additional top layers, such as gold, which may be used for additional electrical interconnections. Polysilicon layers are appropriately doped and subsequently annealed in argon to increase electrical conductivity and reduce stresses. Sacrificial layers too are annealed in argon to reduce stresses.

All sacrificial layers can be removed by appropriate wet or dry etching techniques in order to release the first and second members 271, 272. Members 271, 272 may have etch/access-holes patterned in to facilitate sacrificial layer removal. Layer 276 may be appropriately planarised and/or levelled with 273 to provide a smoother and more levelled 271 layer (for example, as in the SUMMiT process).

There are a number of other ways of laying layer 273 including thermal oxidation or forming silicon nitride with layer 272 after the removal of 277, followed by the deposition of layer 271. As shown in FIGS. 30A–C, the device is directly attached to the substrate which is an alternative method to that of FIG. 2a. The latter attachments may be obtained by extending layer 275 under 272, 273 and then appropriately under-etching 275 around the base support (or throughout the device as well). Alternatively or in addition to this, a separate base support may be made similar to that of the anchor pads 273, prior to depositing 272.

The standard Cronos Integrated Microsystems' MUMPs fabrications process may alternatively be used by alleviating the need for an additional insulating layer between E1 and E2 by using, instead, an "under-etching" of the sacrificial layer (for example 276 in FIGS. 30A–C) during its removal, so as to leave parts as anchor pads. Under-etching basically relies on controlled or selective etching of the sacrificial layer (for example, 275, 276 in FIG. 30A) such that the etching process may be terminated short of removing the anchor pads. If desired, anchor pad positions may additionally be treated by an appropriate technique (for example, ion beam, doping and so on) to make them more etch-resistant. An appropriate etch-depth detection technique (manual/automatic) may be used to monitor/control the etching. This "under-etching" method may be facilitated by appropriate dimensioning of relevant layers and/or providing lips, overhangs and access holes (for example in E1/E2) to provide longer etching paths to the anchor pads.

Another process having three structural polysilicon members such as the Sandia's SUMMiT, SUMMiT V may be used for making two or three moveable electrode devices. Bi-directional three-electrode devices similar to that of FIG. 6 may be made. Also two devices in parallel may be made by this method. The third structural polysilicon may be used for additional purposes such as to form the mirror in FIGS. 14–19 above the actuators (or adjacent) if desired.

The devices disclosed herein can operate at low drive voltages and may thus be monolithically integrated with the drive electronics and circuits using standard or modified IC processes and technologies such as CMOS, CMOS & MEMS or post-CMOS, BiCMOS for example. This can realise smart actuators and sensors by the integration with the drive and control electronics. A number of appropriate methods and techniques known to the skilled person may be used, including the use of one or more of the conductive (metallisation and/or polysilicon) and insulating layers for the moveable members and anchor pads, respectively.

In applications requiring sealed cavity such pumps, pressure sensors, vacuum and fluidic devices, it may not be desirable to have access-holes in E1. Instead, appropriate access holes disposed on E2 alone can provide sufficient paths to reach E1. Any other alternative known technique may be used to remove the sacrificial layers such as by using materials that decompose from solid state directly into vapour when heated like dry-release dendritic materials.

Good layer adhesion may be achieved by any appropriate known techniques including additional one or more adhesion-promotion layers and techniques. As with most MEMS devices, any known anti-stiction technique may be used, for example by providing dimples to ease layer release during fabrication and/or act as bumpers during device use.

Thermal and intrinsic stresses may be managed and controlled by any suitable and appropriate known technique.

An additional membrane of appropriate flexible material such as the example of FIG. 20 may be used for environmental, for example dust and moisture, protection and may also be mounted on the device so as to move and deflect with it.

Microstereolithography "MSL" fabrication may also be used especially for vertically stacked devices and also for devices disposed normal to the substrate.

The first member E1 (or E2) and/or a load member (e.g. mirror in FIG. 14) may be made of single crystal silicon, for example by appropriate bulk or a mixture of surface and bulk micromachining processes.

The above description sets out many of the advantages and features of the invention taught herein in its described embodiments.

As well as actuators, the devices described herein may also be used as mechanical-to-electrical transducers and sensors deflectable about one or more axes. Mechanical deflections D cause changes in the capacitance value d(C) between electrodes E1 and E2 that can be used for sensing purposes. As in the actuation versions, the maintenance of close proximity of electrodes E1 and E2, combined with relatively large active area and capacitance, can give rise to high sensitivity which may be used to advantage in many applications such as microphones, pressure/force sensors, inertial sensors, accelerometers and gyroscopes. The same device may perform both functions, that is sensing and actuation, by using separate dedicated sections on the device, some for actuation and some for sensing. Alternatively, the same device may be used as actuator or sensor at different times by time-sharing or may even do so simultaneously by appropriate techniques known to the skilled person. Thus the movement and positions of actuators can be sensed and measured and/or used in a feedback loop to control or maintain actuator positions which find many applications, e.g. in Fibre-Optic OXC, to accurately deflect and steer optical beams between the channels and to dynamically maintain optimal steering conditions. Other applications include the force-balance sensing techniques and devices.

Actuator and sensor types of device may each have their own individual performance-optimisation parameters. They may also have integrated electronics and logic circuits to realise smart sensors and actuators. In addition, one or more sensor may be mounted on one or more actuator. Sensor sensitivity may be optimised or controlled in variety of known ways. Such sensor devices have inherent bi-directionality, producing d(C) if moved in either forward or reverse directions, although the two values may not be equal. For equal d(C) values, bi-directional sensing devices similar to the bi-directional actuators described herein may be used (for example similar to that of FIG. 6). In certain sensing applications, at least one of electrodes E1 and E2 may be or may contain an electret material such as Teflon™ or PVDF for improved performance.

The devices described herein may operate at any desirable and appropriate voltage, in an analogue and/or digital fashion, and may use smart or on-board electronic drives and circuits, and may also use voltage versus deflection linearisation techniques of known type. These and other techniques may also be used to drive the device in an oscillating mode or a.c. fashion, at any desirable frequency, whether resonant or not. For example, a.c. drive at/near resonance may produce much enhanced deflections, which may be desirable in some applications.

In order to prevent contact between the electrodes E1, E2 due, for example, to excessive voltage levels (snap-down, snap-over or pull-in phenomenon), any appropriate deflection-range extension/anti-collapse technique may be used. This may apply to individual cells and/or to the overall device. An external limiting or stop member may also be used, with damping/spring action to soften impact if desired. For example, stops 48 shown in connection with device 30 and a similar stop in the bridge types of device (appropriately situated, for example at their centre) may be used.

Preferably electrodes E1, E2 may have smooth surfaces without sharp points or protrusions to prevent voltage breakdown at higher fields.

Part of the electrostatic energy stored in the activated device may be recovered after the device returns to its undeflected state by appropriate techniques. The device may alternatively be actuated by on-board electric generators such as photovoltaic devices.

Each device may use identical or different cells. The shape and dimensions, for example length, thickness, pitch, stiffness and/or materials, may be same or different from cell to cell within any one device. For example, the cells may have progressively narrower width from one end of a device to the other, which may provide an improved method of loading distribution within the device itself and/or energy delivery to the output load. In another example, each cell may be so designed so as to handle an appropriate portion of force/energy for optimum load drive. In other examples, the cells near to the device support or load may be different and may be appropriately strengthened or otherwise optimised for these tasks.

Any suitable, appropriate and desirable stiffness (k1, k2) values of the first and second electrodes and/or ratio between them may be used (for example, k1>k2, k1<k2, k1=k2). Ratios of k2/k1 greater than 1 may increase the maximum useful deflection Dmax (prior to snap-down). Among other parameters, k may be controlled by t, material type, mechanical properties, required effective width and ridges or grooves along appropriate directions. The aspect ratio of a cell (width over length) may have any desirable value. In addition to thickness t, the effective stiffness k value may also be controlled in a variety of other ways, such as by controlling the effective width of the members, for example by making holes or slits along the width to reduce k1, k2 or by making ridges or grooves to increase k1, k2. The effective stiffness k value inside cells may be made variable, if desired for example near/around the support posts in order to further control/enhance device deflection and performance. Additionally, electrode E1 may have slits or apertures to promote desired deflections. The dimensions, properties and spacing between the support posts (for example, along width) may be appropriately chosen to obtain desired performance.

Overlap between adjacent cells (as in the embodiment of FIG. 1) may control and influence the magnitude of D and/or F. It may be of any suitable/appropriate value.

The intervening space between the first and second members in the devices described may contain air, vacuum, one or more of: gas, liquid, gel or deformable-solid material.

The useful work/energy is delivered mostly by the first member E1 which accordingly should have appropriate strength and properties. It may be strengthened by additional layers (for example 3 or E2) at some positions such as at the device support or load.

A laterally deflecting device, that is deflecting parallel to the substrate plane, may be made using appropriate fabrication processes to make the device lie in a plane normal to the substrate.

Although not specifically described, in some embodiments there will be provided a control unit for controlling the power supply to the electrodes E1 and E2, particularly where the electrodes are to be operated in different manners (for example two or more electrodes E2 to be operated at different voltages to create different deflection effects in an electrode E1) and/or for on/off switching sequence and timing. The structure and features of such a control unit will be readily apparent to the person skilled in electronic control so are not described in detail herein.

The skilled person will readily appreciate that modifications to the above-described embodiments can readily be made within the scope of the claims and that these embodiments are intended to be covered by the claims.

The invention claimed is:

1. An electrostatic device including a first flexible electrode able to be deflected, and a plurality of second electrodes mounted on the first electrode so as to move therewith and to cause deflection of the first electrode upon the application of an electrical charge to the electrodes which causes an electrostatic force to be generated between the first and second electrodes; and at least one support member between the first and second electrodes operable to provide variable deflection between the first and second electrodes upon the application of an electrical charge to the electrodes.

2. A device according to claim 1, wherein the device is mounted on a support.

3. A device according to claim 1, wherein the plurality of second electrodes are mounted proximate one another on the first electrode.

4. A device according to claim 1, wherein the or at least some of the second electrodes are arranged in a linear array.

5. A device according to claim 1, wherein the or at least some of the second electrodes are arranged in a non-linear array.

6. A device according to claim 1, wherein the second electrodes are arranged to produce deflections of the first electrode about more than one axis.

7. A device according to claim 1, including at least one further first electrode, each said further first electrode being provided with at least one second electrode mounted thereon.

8. A device according to claim 7, wherein the first electrodes are coupled together mechanically such that deflection of one first electrode affects at least one of the position, orientation and altitude of the or at least one other first electrode.

9. A device according to claim 8, wherein the first electrodes are arranged in at least one of: serially, in parallel, in different planes and at an angle to one another.

10. A device according to claim 1, wherein the device is capable of movement in at least one of: out of and in its own plane.

11. A device according to claim 10, wherein deflection causes contraction of the device in one of: one and two directions.

12. A device according to claim 1, including a plurality of second electrodes arranged on the first electrode or electrodes in a manner as to provide deflection of the at least one first electrode in opposing directions.

13. A device according to claim 12, wherein at least one second electrode is located on a first surface of at least one first electrode and at least one second electrode is located on an opposing second surface of at least one first electrode.

14. A device according to claim 1, wherein at least one second electrode is stiffer than the first electrode on which it is mounted.

15. A device according to claim 1, wherein at least two adjacent second electrodes overlap.

16. A device according to claim 15, wherein said at least two second electrodes are provided with fingers extending substantially in a plane thereof and which interdigitate with one another.

17. A device according to claim 1, wherein there is provided a common supply rail for supplying the first and second electrodes with power.

18. A device according to claim 1, wherein there is provided a plurality of supply rails for supplying at least one first and at least one second electrodes in different manners.

19. A device according to claim 17, including a control unit operable to control electrical power applied to the first and second electrodes.

20. A device according to claim 1, wherein at least one second electrode is mounted on the first electrode in at least one of a bridge manner and a cantilever manner.

21. A device according to claim 1, wherein at least one of the first and second electrodes are layered members including at least one conductive layer.

22. A device according to claim 1, wherein at least one of the first and second electrodes has at least one of: apertures, weakness and strengthening areas to adjust the deflection properties thereof.

23. A device according to claim 1, wherein the first electrode is impervious without holes.

24. A device according to claim 1, wherein a gap between the first and second electrodes is kept under a vacuum or filled with at least one of: a gas, liquid, gel and a deformable solid material.

25. A device according to claim 1, wherein at least one second electrode is used as a part of an actuator and at least one second electrode is used as part of a sensor.

26. A device according to claim 1, wherein the device is used both as an actuator and a sensor on a time-sharing basis.

27. An electrostatic device arranged as a sensor including a first flexible electrode able to be deflected, and a plurality of second electrodes mounted on the first electrode so as to move therewith upon the deflection of one or the other or both of the first and second electrodes and to generate a measurable change in capacitance between the first and second electrodes.

28. A device according to claim 27, also arranged as an actuator, in which at least one second electrode is operable to cause deflection of the first electrode upon the application of an electrical charge to the electrodes which causes an electrostatic force to be generated between the first and second electrodes.

29. A device according to claim 28, wherein the device is operable as a sensor and as an actuator at different times or simultaneously.

30. A device according to claim 27, wherein the device is mounted on a support.

31. A device according to claim 27, wherein the plurality of second electrodes are mounted proximate one another on the first electrode.

32. A device according to claim 27, wherein at least one of the second electrodes are arranged in a linear array.

33. A device according to claim 27, wherein at least one of the second electrodes are arranged in a non-linear array.

34. A device according to claim 27, wherein the second electrodes are arranged to deflect with the first electrode about more than one axis.

35. A device according to claim 27, including at least one further first electrode, each said further first electrode being provided with at least one second electrode mounted thereon.

36. A device according to claim 35, wherein the first electrodes are coupled together mechanically such that deflection of one first electrode affects at least one of the position, orientation and altitude of the or at least one other first electrode.

37. A device according to claim 36, wherein the first electrodes are arranged in at least one of: serially, in parallel, in different planes and at an angle to one another.

38. A device according to claim 27, wherein the device is capable of movement in at least one of: out of and in its own plane.

39. A device according to claim 38, wherein deflection causes contraction of the device in one of: one and two directions.

40. A device according to claim 27, including a plurality of second electrodes arranged on the first electrode or electrodes in a manner to deflect with the first electrode in opposing directions.

41. A device according to claim 40, wherein at least one second electrode is located on a first surface of at least one first electrode and at least one second electrode is located on an opposing second surface of the at least one first electrode.

42. A device according to claim 27, wherein at least one second electrode is stiffer than the first electrode on which it is mounted.

43. A device according to claim 27, wherein at least two adjacent second electrodes overlap.

44. A device according to claim 43, wherein said at least two second electrodes are provided with fingers extending substantially in a plane thereof and which interdigitate with one another.

45. A device according to claim 27, wherein there is provided a common supply rail for supplying the first and second electrodes with power.

46. A device according to claim 27, wherein there is provided a plurality of supply rails for supplying at least one first and at least one second electrodes in different manners.

47. A device according to claim 45, including a control unit operable to control electrical power applied to the first and second electrodes.

48. A device according to claim 27, wherein at least one second electrode is mounted on the first electrode in at least one of a bridge manner and a cantilever manner.

49. A device according to claim 27, wherein at least one of the first and second electrodes are layered members including at least one conductive layer.

50. A device according to claim 27, wherein at least one of the first and second electrodes has at least one of: apertures, weakness and strengthening areas to adjust the deflection properties thereof.

51. A device according to claim 27, wherein the first electrode is impervious without holes.

52. A device according to claim 27, wherein a gap between the first and second electrodes is kept under a vacuum or filled with at least one of: a gas, liquid, gel and a deformable solid material.

53. A device according to claim 27, wherein at least one second electrode is used as a part of an actuator and at least one second electrode is used as part of a sensor.

54. An electrostatic device according to claim 1 or 27, produced by an integrated circuit fabrication, a MEMS fabrication or a microfabrication process.

55. A mirror assembly including an electrostatic device according to claim 1 or 27.

56. One of a speaker, earphone, microphone, ultrasonic detector and transducer assembly including an electrostatic device according to claim 1 or 27.

57. A robotic device including an electrostatic device according to claim 1 or 27.

58. One of an optical scanner, beam steering and all-optical-switch assembly including an electrostatic device according to claim 1 or 27.

59. One of a pressure sensor, pump and inkjet cartridge assembly including an electrostatic device according to claim 1 or 27.

60. One of an accelerometer and sensor assembly including an electrostatic device according to claim 1 or 27.

61. One of a one, two and three dimensional array of at least two electrostatic devices according to claim 1 or 27.

62. A device according to claim 18, including a control unit operable to control electrical power applied to the first and second electrodes.

63. A device according to claim 46, including a control unit operable to control electrical power applied to the first and second electrodes.

* * * * *